United States Patent
Harrison et al.

(10) Patent No.: US 11,121,835 B2
(45) Date of Patent: Sep. 14, 2021

(54) EFFICIENT SRS RESOURCE INDICATION METHODS

(71) Applicant: TELEFONAKTIEBOLAGET LM ERICSSON (PUBL), Stockholm (SE)

(72) Inventors: Robert Mark Harrison, Grapevine, TX (US); Sebastian Faxér, Järfälla (SE); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/447,680

(22) Filed: Jun. 20, 2019

(65) Prior Publication Data

US 2019/0319759 A1 Oct. 17, 2019

Related U.S. Application Data

(63) Continuation of application No. 16/195,959, filed on Nov. 20, 2018, now Pat. No. 10,374,768, which is a
(Continued)

(51) Int. Cl.
*H04B 7/00* (2006.01)
*H04L 5/00* (2006.01)
(Continued)

(52) U.S. Cl.
CPC ......... *H04L 5/0048* (2013.01); *H04B 7/0456* (2013.01); *H04L 5/005* (2013.01);
(Continued)

(58) Field of Classification Search
CPC . H04W 72/02; H04W 72/0413; H04W 72/06; H04W 72/10; H04W 4/18;
(Continued)

(56) References Cited

U.S. PATENT DOCUMENTS 8,428,018 B2 * 4/2013 Noh ............... H04B 7/0617
370/329
8,588,206 B2 11/2013 Safavi et al.
(Continued)

FOREIGN PATENT DOCUMENTS

| CN | 109391304 B | 11/2020 |
| RU | 2551906 C2 | 6/2015 |
| WO | 2017135737 A1 | 8/2017 |

OTHER PUBLICATIONS

Ericsson, "Summary of offline discussion on UL MIMO Open Issues," 3GPP TSG-RAN WG1 NR#3, R1-1716921; Nagoya, Japan, Sep. 18-21, 2017, 2 pages.
(Continued)

*Primary Examiner* — Dmitry Levitan

(57) ABSTRACT

A method of identifying reference signal resources to be used in a transmission by a wireless device is disclosed. The method comprises a wireless device receiving signaling configuring the wireless device with a plurality of reference signal resource groups, each group comprising a plurality of reference signal resources. The wireless device subsequently receives an indication, in a control channel, of a selection of reference signal resources to be used. Each of the plurality of reference signal resources to be used is selected from a different one of the plurality of reference signal resource groups such that reference signal resources belonging to the same reference signal resource group are not selected for simultaneous use. A reference signal is then transmitted to a network node in the network using the indicated selection of reference signal resources.

12 Claims, 25 Drawing Sheets

| Selected SRS group indices | | | | | $Y(g_1, g_2, \ldots, g_{L_{max}})$ (binary) | $Y(g_1, g_2, \ldots, g_{L_{max}})$ (decimal) |
|---|---|---|---|---|---|---|
| $g_0$ | $g_1$ | $g_2$ | $g_3$ | $L$ | | |
| 1 | - | - | - | 1 | 0000 | 0 |
| 2 | - | - | - | 1 | 0001 | 1 |
| 3 | - | - | - | 1 | 0010 | 2 |
| 4 | - | - | - | 1 | 0011 | 3 |
| 1 | 2 | - | - | 2 | 0100 | 4 |
| 1 | 3 | - | - | 2 | 0101 | 5 |
| 1 | 4 | - | - | 2 | 0110 | 6 |
| 2 | 3 | - | - | 2 | 0111 | 7 |
| 2 | 4 | - | - | 2 | 1000 | 8 |
| 3 | 4 | - | - | 2 | 1001 | 9 |
| 1 | 2 | 3 | - | 3 | 1010 | 10 |
| 1 | 2 | 4 | - | 3 | 1011 | 11 |
| 1 | 3 | 4 | - | 3 | 1100 | 12 |
| 2 | 3 | 4 | - | 3 | 1101 | 13 |
| 1 | 2 | 3 | 4 | 4 | 1110 | 14 |

Related U.S. Application Data continuation of application No. PCT/IB2018/057656, filed on Oct. 2, 2018.

(60) Provisional application No. 62/567,156, filed on Oct. 2, 2017.

(51) Int. Cl.
*H04B 7/0456* (2017.01)
*H04W 72/04* (2009.01)
*H04L 5/14* (2006.01)

(52) U.S. Cl.
CPC .......... *H04L 5/0023* (2013.01); *H04L 5/0092* (2013.01); *H04W 72/0413* (2013.01); *H04L 5/1469* (2013.01); *H04W 72/046* (2013.01)

(58) Field of Classification Search
CPC ..... H04W 4/20; H04W 28/18; H04W 72/042; H04W 72/1263
USPC ......................................... 370/310, 328, 329
See application file for complete search history.

(56) References Cited

U.S. PATENT DOCUMENTS

| | | | |
|---|---|---|---|
| 8,792,584 B2 | 7/2014 | Koo et al. | |
| 8,873,602 B2 | 10/2014 | Zhou et al. | |
| 8,891,452 B2 | 11/2014 | Nishio et al. | |
| 9,154,276 B2* | 10/2015 | Akimoto | H04L 5/0026 |
| 9,173,208 B2 | 10/2015 | Ouchi et al. | |
| 9,301,316 B2 | 3/2016 | Moulsley et al. | |
| 9,337,982 B2 | 5/2016 | Geirhofer et al. | |
| 9,419,735 B2 | 8/2016 | McCrea | |
| 9,445,398 B2 | 9/2016 | Wang et al. | |
| 9,479,951 B2 | 10/2016 | Curtin et al. | |
| 9,503,231 B2* | 11/2016 | Gaal | H04L 5/0048 |
| 9,585,126 B2 | 2/2017 | Fujimoto | |
| 9,661,589 B2 | 5/2017 | Ouchi et al. | |
| 9,730,204 B2* | 8/2017 | Yi | H04W 28/0268 |
| 9,923,686 B2 | 3/2018 | Kim et al. | |
| 10,038,484 B2* | 7/2018 | Davydov | H04W 28/26 |
| 10,090,986 B2 | 10/2018 | Kim et al. | |
| 10,097,324 B2* | 10/2018 | Behravan | H04L 5/0048 |
| 10,374,768 B2 | 8/2019 | Harrison et al. | |
| 10,735,157 B2 | 8/2020 | Liu et al. | |
| 2011/0170497 A1* | 7/2011 | Lin | H04L 5/0048 370/329 |
| 2013/0034066 A1 | 2/2013 | Kakishima et al. | |
| 2017/0331602 A1 | 11/2017 | Hugl et al. | |
| 2018/0227094 A1* | 8/2018 | Liu | H04L 5/0094 |
| 2018/0337716 A1 | 11/2018 | Fakoorian et al. | |
| 2018/0368104 A1* | 12/2018 | Xia | H04W 72/0413 |
| 2019/0141770 A1* | 5/2019 | Takahashi | H04W 8/24 |
| 2020/0083998 A1 | 3/2020 | Chen | |
| 2020/0213053 A1 | 7/2020 | Faxér et al. | |
| 2020/0244334 A1 | 7/2020 | Huang et al. | |
| 2020/0366429 A1 | 11/2020 | Huang et al. | |
| 2021/0091907 A1 | 3/2021 | Harrison et al. | |

OTHER PUBLICATIONS

Ericsson, "UL MIMO for codebook based transmission," 3GPP TSG-RAN WG1 #90, R1-1714271; Prague, Czech Republic, Aug. 21-25, 2017, 12 pages.

Ericsson, "UL MIMO procedures for codebook based transmission," 3GPP TSG-RAN WG1 #89ah-NR, R1-1711008; Qingdao, China, Jun. 27-30, 2017, 8 pages.

Intel et al., "Way Forward on Uplink Multi-panel and Multi-TRP operation," 3GPP TSG RAN WG1 Meeting #89, R1-1709735; Hangzhou, P.R. China, May 15-19, 2017, 2 pages.

Ericsson, "UL MIMO procedures for codebook based transmission," 3GPP TSG RAN WG1 Meeting #89, R1-1708669; Hangzhou, P.R. China, May 15-19, 2017, 9 pages.

Ericsson, "UL MIMO for non-codebook based transmission," 3GPP TSG-RAN WG1 NR Ad Hoc #3, RI-1716342; Nagoya, Japan, Sep. 18-21, 2017, 5 pages.

Ericsson, "On codebook based UL MIMO transmission with precoded SRS," 3GPP TSG-RAN WG1 #88, R1-1703225; Athens, Greece, Feb. 13-17, 2017, 5 pages.

Ericsson, "UL MIMO for non-codebook based transmission," 3GPP TSG-RAN WG1 #90, R1-1714272; Prague, Czech Republic, Aug. 21-25, 2017, 4 pages.

LG Electronics et al., "WF on SRS Tx beam determination", 3GPP TSG RAN1 #89, Hangzhou, P.R. China, May 15-19, 2017, pp. 1-4, R1-1709376, 3GPP.

Huawei et al., "Non-codebook based transmission for UL MIMO", 3GPP TSG RAN WG1 Meeting #90, Prague, Czech Republic, Aug. 21-25, 2017, pp. 1-8, R1-1712229, 3GPP.

Qualcomm Incorporated, "Non-Codebook Based UL Transmission", 3GPP TSG RAN WG1 NR Ad-Hoc #3, Nagoya, Japan, Sep. 18-21, 2017, pp. 1-4, R1-1716389, 3GPP.

Ericsson, "UL MIMO for non-codebook based transmission," 3GPP TSG-RAN WG1 NR Ad Hoc #3, R1-1716342; Nagoya, Japan, Sep. 18-21, 2017, 5 pages.

3rd Generation Partnership Project, "3rd Generation Partnership Project; Technical Specification Group Radio Access Network; NR; Physical layer procedures for data (Release 15)", Technical Specification, 3GPP TS 38.214 V0.1.2, pp. 1-33, Sep. 2017, 3GPP, France.

Catt, "Discussion on non-codebook based UL MIMO transmission," 3GPP TSG RAN WG1 #90, R1-1712365; Prague, Czechia, Aug. 21-25, 2017, 3 pages.

* cited by examiner

| SRI signaling bits | Beam Panel A | Beam Panel B |
|---|---|---|
| 0000 | Beam A1 | Beam B1 |
| 0001 | Beam A1 | Beam B2 |
| 0010 | Beam A1 | Beam B3 |
| 0011 | Beam A1 | Beam B4 |
| 0100 | Beam A2 | Beam B1 |
| 0101 | Beam A2 | Beam B2 |
| 0110 | Beam A2 | Beam B3 |
| 0111 | Beam A2 | Beam B4 |
| 1000 | Beam A3 | Beam B1 |
| 1001 | Beam A3 | Beam B2 |
| 1010 | Beam A3 | Beam B3 |
| 1011 | Beam A3 | Beam B4 |
| 1100 | Beam A4 | Beam B1 |
| 1101 | Beam A4 | Beam B2 |
| 1110 | Beam A4 | Beam B3 |
| 1111 | Beam A4 | Beam B4 |

FIG. 6

| Selected SRS group indices | | | | $L$ | $Y(g_1, g_2, ..., g_{Lmax})$ (binary) | $Y(g_1, g_2, ..., g_{Lmax})$ (decimal) |
|---|---|---|---|---|---|---|
| $g_0$ | $g_1$ | $g_2$ | $g_3$ | | | |
| 1 | - | - | - | 1 | 0000 | 0 |
| 2 | - | - | - | 1 | 0001 | 1 |
| 3 | - | - | - | 1 | 0010 | 2 |
| 4 | - | - | - | 1 | 0011 | 3 |
| 1 | 2 | - | - | 2 | 0100 | 4 |
| 1 | 3 | - | - | 2 | 0101 | 5 |
| 1 | 4 | - | - | 2 | 0110 | 6 |
| 2 | 3 | - | - | 2 | 0111 | 7 |
| 2 | 4 | - | - | 2 | 1000 | 8 |
| 3 | 4 | - | - | 2 | 1001 | 9 |
| 1 | 2 | 3 | - | 3 | 1010 | 10 |
| 1 | 2 | 4 | - | 3 | 1011 | 11 |
| 1 | 3 | 4 | - | 3 | 1100 | 12 |
| 2 | 3 | 4 | - | 3 | 1101 | 13 |
| 1 | 2 | 3 | 4 | 4 | 1110 | 14 |

EFFICIENT SRS RESOURCE INDICATION METHODS

This application is a continuation of U.S. application Ser. No. 16/195,959, filed Nov. 20, 2018, which is a continuation of International Application No. PCT/IB2018/057656, filed Oct. 2, 2018, which claims the benefit of U.S. Provisional Application No. 62/567,156, filed Oct. 2, 2017, the disclosures of which are fully incorporated herein by reference.

TECHNICAL FIELD

The disclosed subject matter relates generally to telecommunications and more particularly to efficient indication of SRS resources in a next generation mobile wireless communication system.

BACKGROUND

The next generation mobile wireless communication system (5G or NR), will support a diverse set of use cases and a diverse set of deployment scenarios. The later includes deployment at both low frequencies (100s of MHz), similar to LTE today, and very high frequencies (mm waves in the tens of GHz). At high frequencies, propagation characteristics make achieving good coverage challenging. One solution to the coverage issue is to employ high-gain beamforming, typically in an analog manner, in order to achieve satisfactory link budget. Beamforming will also be used at lower frequencies (typically digital beamforming), and is expected to be similar in nature to the already standardized 3GPP LTE system (4G).

Moreover, it is expected that large parts of future NR networks will be deployed for TDD. One benefit with TDD (compared to FDD) is that TDD enables reciprocity based beamforming, which can be applied both at the TRP (i.e. for DL) and the UE (i.e. for UL). For reciprocity based DL transmission it is expected that the UE will transmit Sounding Reference Signals (SRSs) which the TRP will use to estimate the channel between the TRP and UE. The channel estimate will then be used at the TRP to find optimal precoding weights for the coming DL transmission, for example by using eigenbeamforming. In similar way, it is expected that CSI-RS will be used as sounding signal for reciprocity based UL transmissions. It has been agreed in NR that a TRP can indicate a quasi co-location (QCL) assumption to an earlier transmitted DL reference signal (e.g. CSI-RS) that a UE may use when determining UL precoding.

Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The NR standard is currently being specified. A core component in NR is the support of MIMO antenna deployments and MIMO related techniques. It is expected that NR will support uplink MIMO with at least 4 layer spatial multiplexing using at least 4 antenna ports with channel dependent precoding. The spatial multiplexing mode is aimed for high data rates in favorable channel conditions. An illustration of the spatial multiplexing operation is provided in FIG. 4 for where CP-OFDM is used on the uplink.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE and NR uses OFDM in the downlink and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder implemented by precoder matrix, W, can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2$$

where $\hat{H}_n$ is a channel estimate, possibly derived from CSI-RS as described further below, $W_k$ is a hypothesized precoder matrix with index k, and $\hat{H}_n W_k$ is the hypothesized equivalent channel.

In closed-loop precoding for the NR uplink, the TRP transmits, based on channel measurements in the reverse link (uplink), TPMI to the UE that the UE should use on its uplink antennas. The gNodeB configures the UE to transmit SRS according to the number of UE antennas it would like the UE to use for uplink transmission to enable the channel measurements. A single precoder that is supposed to cover a large bandwidth (wideband precoding) may be signaled. It may also be beneficial to match the frequency variations of the channel and instead feed back a frequency-selective precoding report, e.g. several precoders and/or several TPMIs, one per subband.

Other information than TPMI is generally used to determine the UL MIMO transmission state, such as SRS resource indicators (SRIs) as well as transmission rank indicator (TRIs). These parameters, as well as the modulation and coding state (MCS), and the uplink resources where PUSCH is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

Non-Codebook Based UL Transmission

In addition to codebook-based UL transmission, it has been agreed that NR will support a non-codebook based transmission modes, which is applicable when TX/RX reciprocity holds at the UE. In the codebook-based mode, as stated earlier, the UE typically transmits a non-precoded SRS to sound the uplink channel and the gNB determines a preferred precoder from the codebook based on the SRS channel estimates and instructs the UE to apply said precoder on the PUSCH transmission by means of a TPMI comprised in the UL grant.

For non-codebook based UL transmission however, the UE itself determines one or more precoder candidates and uses said precoder candidates to precode one or more SRS in one or more SRS resources. The gNB correspondingly determines one or more preferred SRS resource and instructs the UE to use the precoder(s) applied for precoding the one or more preferred SRS resources also for the PUSCH transmission. This instruction may be signaled in the form of one or more SRI(s) comprised in the DCI carrying the UL grant, but may alternatively or additionally include TRI signaling.

For the UE to determine the UL precoder candidates, it needs to measure a DL reference signal, such as a CSI-RS in order to attain a DL channel estimate. Based on this DL channel estimate, and assuming TX/RX reciprocity holds, the UE can convert the DL channel estimate into an UL channel estimate and use the UL channel estimate to determine a set of UL precoder candidates, for instance by performing a singular value decomposition (SVD) of the UL channel estimate or by other established precoder determination methods. Typically, the gNB would configure the UE, implicitly or explicitly, with which CSI-RS resource it can use to aid precoder candidate determination. In some proposals for NR, this is done by indicating that a certain CSI-RS resource is reciprocally spatially quasi co-located with the SRS resource(s) the UE is scheduled to use for UL sounding, for instance as a part of RRC configuration.

SRS Transmission Setting

How the SRS transmission should be done, for example which SRS resource to use, the number of ports per SRS resource, etc, needs to be signaled to the UE from the TRP. One way to solve this (in a low overhead way) is to pre-define a set of "SRS transmission settings" using higher layer signaling (e.g. RRC) and then indicate in DCI which "SRS transmission setting" that the UE should apply. An "SRS transmission setting" can for example contain information regarding which SRS resources and SRS ports that the UE should use in the coming SRS transmission.

Exactly how SRS transmissions are configured and triggered for NR is still under discussion, a text proposal to 3GPP Technical Specification 38.331 defining the SRS related parameters are given in FIG. 24.

As shown in FIG. 24, the SRS-Config IE is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (that is carried in physical layer downlink control information, 'L1 DCI').

Thus, the RRC configuration of "SRS transmission settings" are done with the IE SRS-Config, which contains a list of SRS-Resources (the list constitutes a "pool" of resources) wherein each SRS resource contains information of the physical mapping of the reference signal on the time-frequency grid, time-domain information, sequence IDs, etc. The SRS-Config also contains a list of SRS resource sets, which contains a list of SRS resources and an associated DCI trigger state. Thus, when a certain DCI state is triggered, it indicates that the SRS resources in the associated set shall be transmitted by the UE.

UL Beam Management

Concepts for UL beam management (i.e. beam management based on UL reference signals) are currently being developed for NR to control the beam (or more correctly the effective antenna pattern) for a respective UE panel. It is expected that UL beam management is performed by letting the UE transmit different SRS resources in different UE panel beams, which the TRP performs RSRP measurements on and signals back the SRI(s) corresponding to the SRS resource(s) with highest RSRP value(s). If a multi-panel UE is scheduled for SRS transmission of multiple beams from each of the multiple panels, the TRP and UE need to have a mutual agreement of which combinations of SRS resources can be transmitted simultaneously from the different panels. Otherwise the TRP could select SRS resources that could not be transmitted simultaneously, such as when the SRS resources correspond to different switched analog beams in the same panel. The following note to the agreement from RAN1 #90 for signaling multiple SRIs (below) addresses this issue but does not conclude on how it should be done. Note: The gNB should only signal SRI(s) such that the UL precoding transmission inferred from the signaled SRI(s) can be simultaneously conducted by the UE.

SUMMARY

To address the foregoing problems with existing approaches, disclosed is a method of identifying reference signal resources to be used in a transmission by a wireless device. The method comprises a wireless device or UE receiving signaling configuring the wireless device with a plurality of reference signal resource groups, each group comprising a plurality of reference signal resources. The wireless device subsequently receives an indication, in a control channel (e.g., PDCCH), of a selection of reference signal resources to be used. Each of the plurality of reference signal resources to be used is selected from a different one of the plurality of reference signal resource groups such that reference signal resources belonging to the same reference signal resource group are not selected for simultaneous use. A reference signal is then transmitted to a network node in the network using the indicated selection of reference signal resources.

In certain embodiments, the reference signal resources are sounding reference signal (SRS) resources and the transmitted reference signal is an SRS. Moreover, in certain embodiments, the reference signal is transmitted for purposes of beam management. The wireless device may include multiple antenna panels, where each of the plurality of reference signal resource groups corresponds to a different one of the antenna panels.

In certain embodiments, the indication of the plurality of reference signal resources to be used includes a bit field, the length of the bit field depending on a maximum number of MIMO layers that the wireless device is configured to transmit and a number of reference signal resources in a corresponding one of the reference signal resource groups. For example, the length of the bit field may be sufficient to indicate S combinations of SRS resources, wherein $S=\sum_{L=1}^{L_{max}} \binom{N}{L}$, and where Lmax is a maximum number of MIMO layers that the wireless device is configured to transmit and N is the number of resources in the first reference signal resource group.

In another embodiment, the method for identifying a plurality of SRS resources to be used in a transmission by the wireless device includes receiving signaling configuring the wireless device with a plurality of SRS resources, receiving an indication, in a physical layer downlink control channel, of SRS resources to be used, and determining from the indication at least a first and a second SRS resource out of the plurality of SRS resources that should be used in a transmission. In this embodiment, the first and second SRS resources are permitted to be any of the plurality of the SRS resources, except where the first and second SRS resources are the same. The wireless device may then transmit at least one of: SRSs identified by the first and second SRS resource, and first and second MIMO layers that are mapped to the first and second SRS resources, respectively.

In certain embodiments, determining the at least first and second SRS resources includes identifying the first and second SRS resources from among the plurality of SRS resources by a first and second index, respectively. Moreover, the first and second indexes further indicate an order in which the first and second SRS resources are to be mapped to the first and second MIMO layers. For example, the first and second MIMO layers may be ranked by quality such that the first MIMO layer is of higher quality than the second MIMO layer and the first MIMO layer is mapped to by a lower one of the first and second indexes (or, alternatively, the first MIMO layer is mapped to a higher one of the first and second indexes).

In certain embodiments, the wireless device determines the first and second SRS resources using a table. The table may include only one entry for each possible ordering of a combination of SRS resources, thereby restricting the total number of selectable SRS resource combinations.

Also disclosed is a method for configuring and indicating use of reference signal transmission settings in a wireless device operable in a wireless communication network. The method may be implemented by a network node, such as a base station. The method includes transmitting signaling configuring the wireless device with a plurality of reference signal resource groups, each group comprising a plurality of reference signal resources (e.g., SRS resources). The method further includes transmitting an indication, in a control channel, of a selection of reference signal resources to be used, wherein the network node selects each of the plurality of reference signal resources to be used from a different one of the plurality of reference signal resource groups such that reference signal resources belonging to the same reference signal resource group are not selected for simultaneous use. The method further includes receiving a reference signal (e.g., an SRS) from the wireless device using the indicated selection of reference signal resources.

Also disclosed is a wireless device comprising processing circuitry configured to perform the steps of any one of the foregoing embodiments.

According to another embodiment, a network node (e.g., base station) implements a method that comprises transmitting signaling configuring the wireless device with a plurality of SRS resources. The method further includes transmitting an indication, in a physical layer downlink control channel, of SRS resources to be used in a transmission, the SRS resources including at least a first and a second SRS resource out of the plurality of SRS resources. The first and second SRS resources are permitted to be any of the plurality of the SRS resources, except where the first and second SRS resources are the same. The method further includes receiving at least one of: SRSs identified by the first and second SRS resource, and first and second MIMO layers that are mapped to the first and second SRS resources, respectively.

Also disclosed is a wireless device comprising processing circuitry configured to perform the steps of any one of the foregoing embodiments.

Also disclosed is a network node comprising processing circuitry configured to perform the steps of any one of the foregoing methods implemented in a network node.

Technical advantages of the foregoing embodiments include a reduced number of possible reference signal resource indicator states and hence signaling overhead is reduced based on the fact that reference signal resources belonging to the same reference signal resource group cannot be selected simultaneously by a transmission point (e.g., network node or base station).

Reduced downlink control channel overhead for reference signal resource indicator signaling may be achieved in, for example, multi-panel UEs performing UL beam management, and/or when using non-codebook based UL MIMO transmission. Some embodiments further allow a flexible mapping of SRS resources to MIMO layers in order to control the quality of the layers. Other embodiments have reduced flexibility to map SRS resources to MIMO layers, while using less downlink control channel overhead.

BRIEF DESCRIPTION OF THE DRAWINGS

The drawings illustrate selected embodiments of the disclosed subject matter. In the drawings, like reference labels denote like features.

FIG. 6 is a table with an example mapping between different SRI states and corresponding SRI signaling bits for the wireless device shown in FIG. 5.

FIG. 7 is a table with an example set of different SRI group indices and corresponding binary and decimal representations of the SRI group indices.

Figure 24:
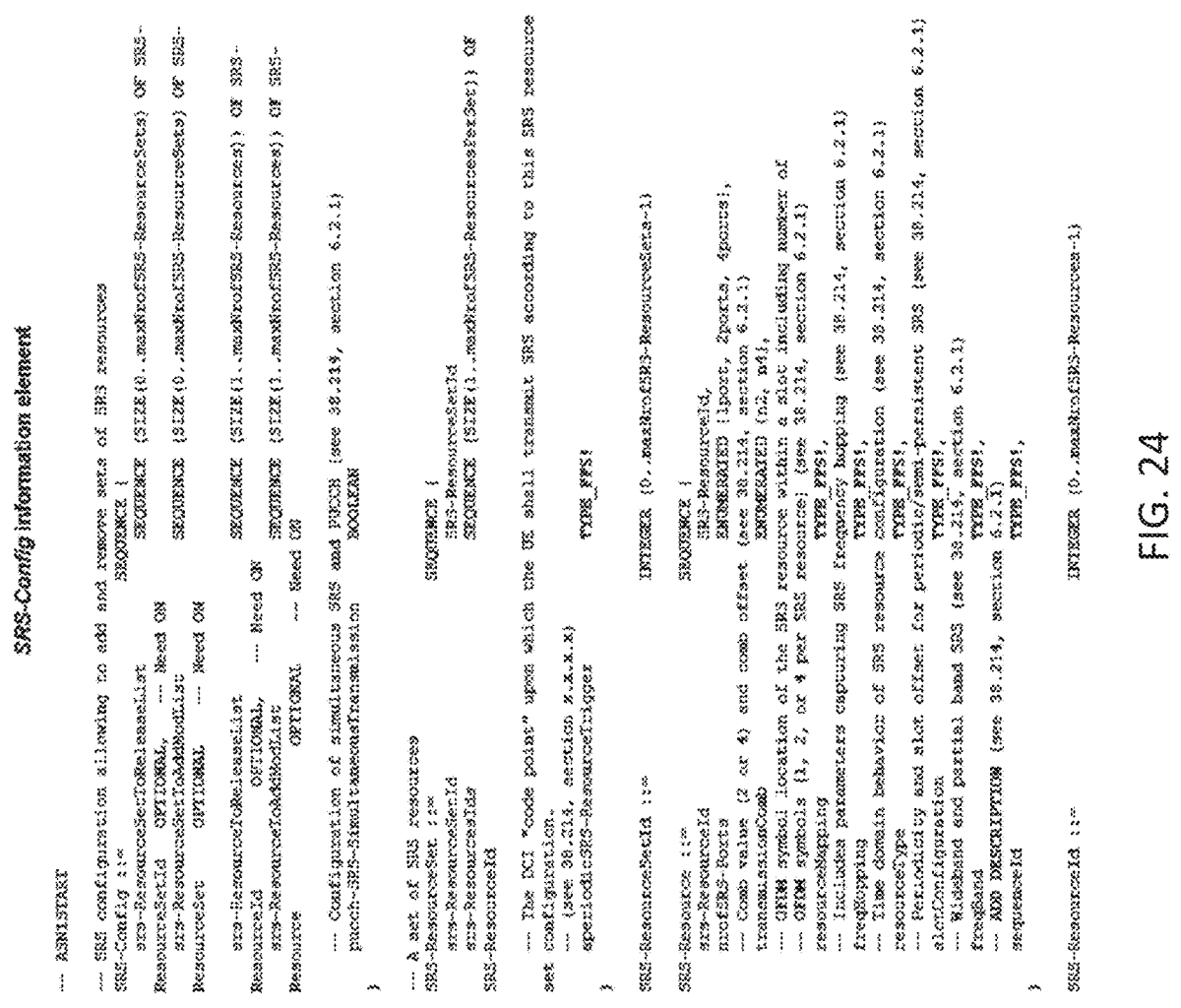

FIG. 24 illustrates a sounding reference signal (SRS) configuration information element used to configure SRS resources in a wireless device.

DETAILED DESCRIPTION

Figure 1:
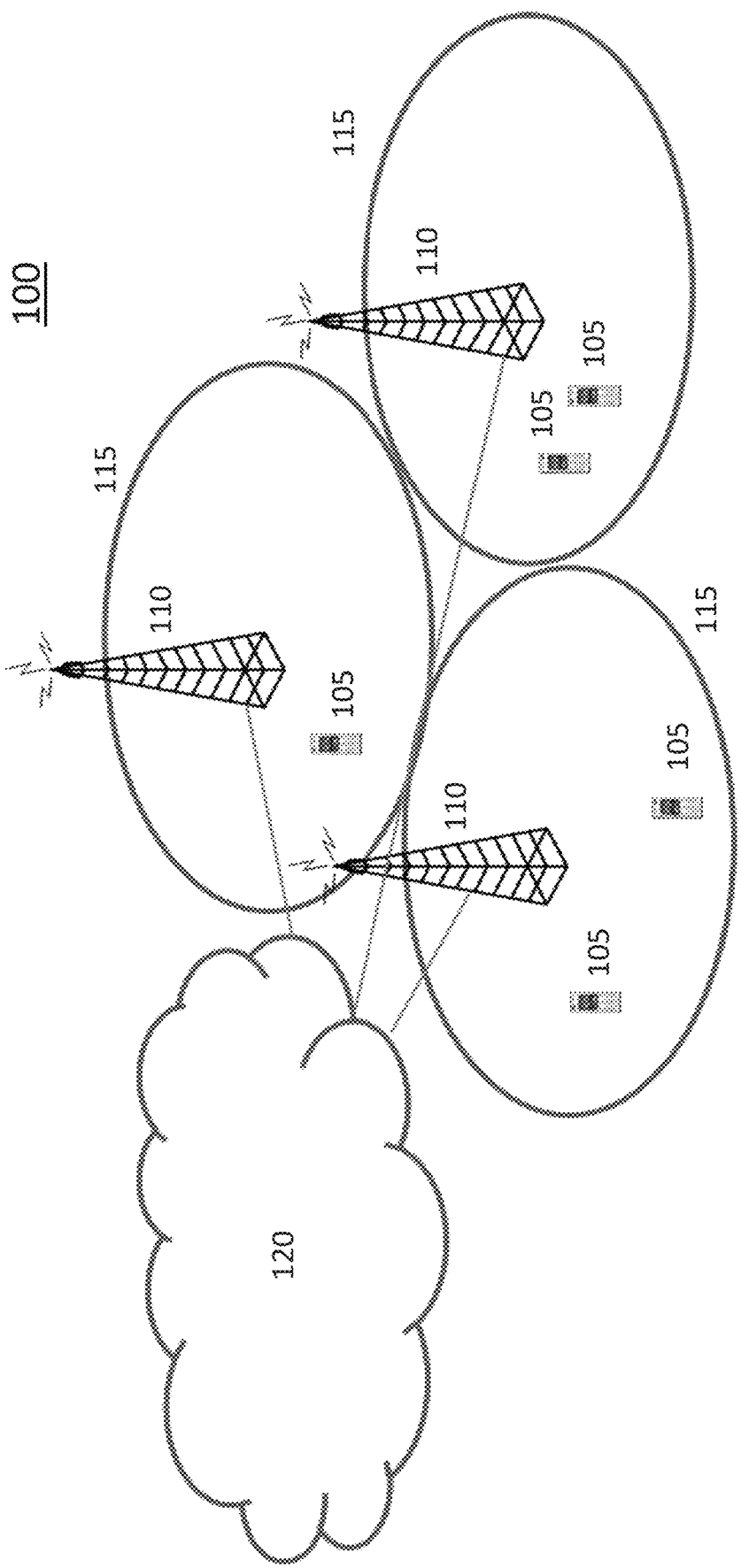
FIG. 1 is a diagram illustrating a wireless communication network.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Radio Node:

As used herein, a "radio node" is either a radio access node or a wireless device.

Controlling Node:

As used herein, a "controlling node" either a radio access node or a wireless device used to manage, control or configure another node.

Radio Access Node:

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network or a gNB in a 3GPP NR network), a TRP in a distributed base station, a high-power or macro base station, a low-power base station (e.g., a micro base station, a pico base station, a home eNB, or the like), and a relay node.

Core Network Node:

As used herein, a "core network node" is any type of node in a Core Network (CN). Some examples of a core network node include, e.g., a Mobility Management Entity (MME), an Evolved-Serving Mobile Location Center (E-SMLC), a Packet Data Network (PDN) Gateway (P-GW), a Service Capability Exposure Function (SCEF), or the like.

Wireless Device:

As used herein, a "wireless device" is any type of device that is capable of wirelessly transmitting and/or receiving signals to/from another wireless device or to/from a network node in a cellular communications network to obtain has access to (i.e., be served by) the cellular communications network. Some examples of a wireless device include, but are not limited to, a User Equipment (UE) in a 3GPP network, a Machine Type Communication (MTC) device, an NB-IoT device, a FeMTC device, etc.

Network Node:

As used herein, a "network node" is any node that is either part of the radio access network or the CN of a cellular communications network/system or a test equipment node.

Signaling:

As used herein, "signaling" comprises any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

As discussed in the background section, if a multi-panel UE is scheduled for SRS transmission of multiple beams from each of the multiple panels, the TRP and UE need to have a mutual agreement of which combinations of SRS resources can be transmitted simultaneously from the different panels. Embodiments of the invention facilitate efficient signaling of an indication of SRS resources to be used.

Figure 5:
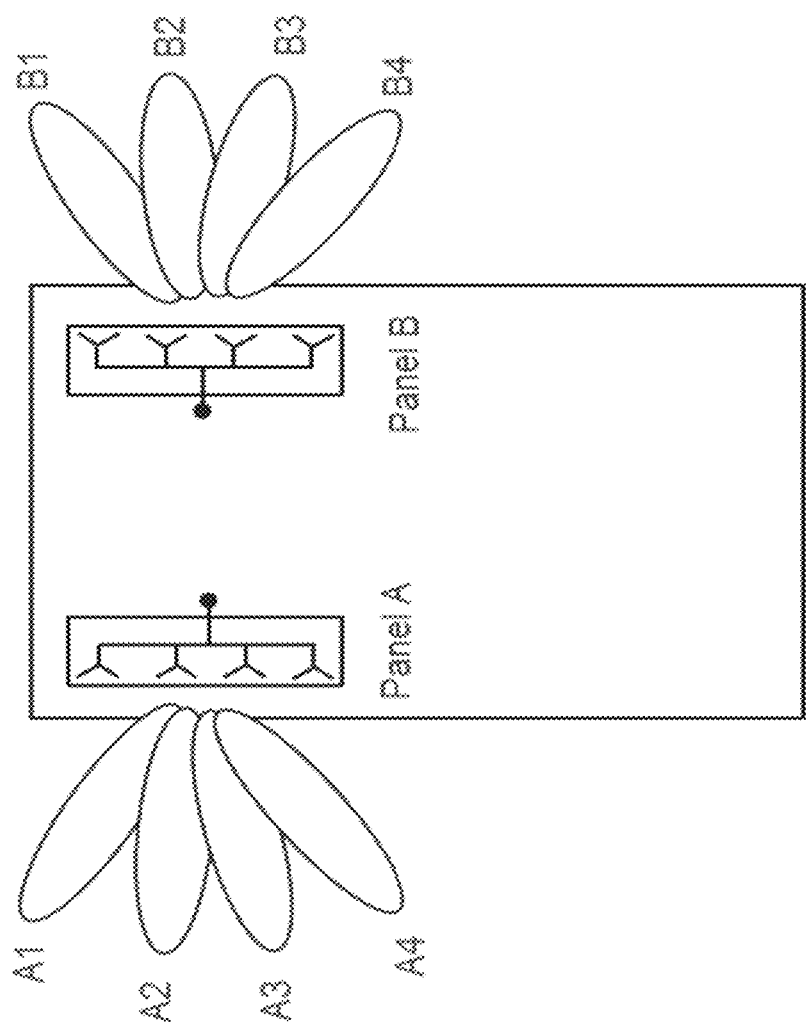
FIG. 5 is a graphical illustration of an example wireless device with two panels and corresponding SRS resource groups.

According to one embodiment, groups of SRS resources are identified, where only one of the resources in an SRS resource group can be transmitted at a time. The one resource from each of the SRS resource groups can be transmitted simultaneously with each of the other selected SRS resources from the other groups. Given the knowledge of the number of SRS resource groups, and which SRS resources are in the groups, the TRP can determine which SRS resources it can instruct the UE to transmit when multiple SRIs are signaled. One example will be given below:

Assume a UE with two panels (Panel A and Panel B), where each panel has four analog beams (A1-A4 and B1-B4), as illustrated in FIG. 5. The UE will start with signaling to the TRP, in UE capabilities, that it has two SRS resource groups, where each SRS resources group consists of four SRS resources. Then the TRP will configure the UE (using RRC signaling) with different SRS resource sets (as was described above). For example, one SRS resource set may consist of eight SRS resources, where SRS resources 1-4 belong to a first SRS resource group and SRS resource 5-8 belong to a second SRS resource group. During a UE TX beam sweep procedure, the TRP can trigger this SRS resource set (by an indication in an aperiodic SRS transmission request) and the UE will know which SRS resources that should be transmitted on the same panel and which SRS resource that should be transmitted on different panels. The TRP can then perform measurements on the eight transmitted SRS resources, determine the best SRS resource for each SRS resource group and signal the corresponding SRIs back to the UE. Note that each SRS resource can consist of one or several SRS ports, hence the procedure can be applied for both non-codebook based (single SRS port per SRS resource) and codebook based UL transmissions (one or several SRS ports per SRS resource). However, note that, for non-codebook based UL transmission where each SRS resource are allowed to be precoded over multiple antenna ports, the SRS precoding in this case (i.e. when UL beam management is present) should not be applied over antenna ports belonging to different panels (because then the mutual agreement that certain SRS resource only belongs to a certain panel is broken).

In some embodiments, the number of possible SRI states and hence the SRI signaling overhead is reduced based on the fact that SRS resources belonging to the same SRS resource group cannot be selected simultaneously by the TRP. This can be done by RRC configuring a mapping between SRI signaling bits and the possible SRI states for SRS resource sets that contains multiple SRS resource groups. In such embodiments, SRS groups may be selected from the total set of SRS groups configured to a UE and SRS resources selected from the selected SRS groups.

In other embodiments, each of $L_{max}$ SRS resources is selected from all of the remaining possible SRS resources in the SRS resources configured to a UE, thereby allowing the SRS resources to be mapped to MIMO layers in a desired order.

In other embodiments, combinations of SRS resources are selected according to a single fixed ordering method thereby using fewer bits for SRI signaling but not allowing arbitrary ordering of the SRS resource to MIMO layer mapping.

Reduced downlink control channel overhead for SRI signaling may be achieved in, for example, multi-panel UEs performing UL beam management, and/or when using non-codebook based UL MIMO transmission. Some embodiments further allow a flexible mapping of SRS resources to MIMO layers in order to control the quality of the layers. Other embodiments have reduced flexibility to map SRS resources to MIMO layers, while using less downlink control channel overhead.

In one example for "normal" SRS transmission (e.g. SRS transmission for non-codebook based/codebook based UL transmission without UL beam management), the SRI signaling from the TRP can indicate to the UE which SRS resources it should use for PUSCH transmission and the order in which they should be mapped to spatially multiplexed ('MIMO') PUSCH layers. The signaling selects any one of the SRS resources to be transmitted on a first MIMO PUSCH layer, such as one that the gNB deems to have the best quality (e.g. SINR, SINR, etc), then any SRS resource of the remaining resources to be transmitted to a second MIMO PUSCH layer that it deems to have the next best quality, and so on, until it has selected $L_{max}$ SRS resources in order of descending quality. Note that in some embodiments, metrics other than quality may be used to select the SRS resources. The total number of SRI states that need to be signaled to the UE in this embodiment is then: $S_T = \Sigma_{L=1}^{L_{max}} S_L$, where $S_L = N \cdot (N-1) \cdot \ldots \cdot (N-(L-1))$ or, equivalently, $$S_L = \frac{N!}{(N-L)!},$$

is the number of SKI states for a given number of layers L, N is the number of SRS resources in the triggered SRS resource set, L is a number of SRS resources that can be triggered by SRI, and $L_{max}$ is the maximum number of SRS resources the UE simultaneously can transmit on (i.e. for single SRS port SRS resources, L and $L_{max}$ equal the number of layers and the maximum number of layers, respectively, the UE can be signaled to transmit simultaneously). The large amount of possible SRI states will lead to a large SRI overhead signaling. For example, assume the number of SRS resources in the SRS resource set is equal to eight and the maximum number of PUSCH transmission layers equals to one or two (i.e. N=8; L=1 or 2), then the total possible number of SRI states $S_T$=8+8·7=64. This means that 6 bits are required to indicate the chosen SRI state to the UE in this embodiment.

The order of the SRS resources with respect to the corresponding PUSCH MIMO layers may not be important, for example when a single channel coded transport block is mapped across the MIMO layers and a single modulation and coding state is used (also known as 'single codeword' MIMO transmission). Therefore, in an embodiment, the SRI signaling from the TRP to the UE consists of $S_T = \Sigma_{L=1}^{L_{max}} S_L = \Sigma_{L=1}^{L_{max}} \binom{N}{L}$ possible SRI states where $$\binom{N}{k}$$

is the number of combinations of N values taken k at a time, and N, L, and $L_{max}$ are the same as defined above. In this embodiment with, N=8 and L=1 or 2, then the total possible number of SRI states $$S_T = S_1 + S_2 = \binom{8}{1} + \binom{8}{2} = 8 + 28 = 36.$$

This means that 6 bits are still required to indicate the chosen SRI state to the UE. Similarly, if selection is restricted to only L=2 SRS resources, then the possible number of SRI states is $$S_2 = \binom{8}{2} = 28.$$

This means that 5 bits are required to indicate the chosen SRI state to the UE in this case.

Further reductions in SRI overhead are possible by taking into account constraints on SRS and/or PUSCH MIMO layer transmission. By way of example, assume there is a UE with two panels and four analog beams per panels as illustrated in FIG. 5. In such case, many of the possible SRI states will not be allowed because only one SRS resource from each SRS resource group can be selected. (Note that we use the term 'SRS resource group' rather than 'SRS resource set' here to emphasize the constraints on SRS selection; both are a list of SRS resources configured to the UE, and an SRS resource set that is constrained in this way is equivalent to an SRS resource group) Hence, in this case it is preferred to do a mapping between the possible SRI states and the SRI signaling bits in order to reduce the overhead. In this example, L=2 SRS resources are selected: only one of A1-A4 beams in panel A and one out of B1-B4 beams in panel B. Hence the total number of SRI states will be 4×4=16, which will require 4 SRI signaling bits (which is 20% reduction compared to the example above that required 5 bits for L=2 selected SRS resources). FIG. 6 illustrates a table with the mapping between the different SRI states and the SRI signaling bits.

More generally the formula for number of SRI states for an embodiment can be written as $S_T = \Sigma_{g=1}^{N_g} (\Sigma_{g=1}^{N_s(g)} \Pi_{i \in G_k} M_i)$, where $$N_s(g) = \binom{N_g}{g}$$

states are used to select any of g SRS resource groups in a single, fixed, order, and $\Pi_{i \in G_k} M_i$ states (each associated with an SRS resource group selection state) are used to select one SRS resource (corresponding to a beam) from each of the selected SRS resource groups, where $M_i$ is the number of SRS resources (beams) for a selected SRS resource group with index i (corresponding to an $i^{th}$ panel), $G_k$ is a $k^{th}$ set of indices of the selected SRS resource groups (i.e. $G_k$ is a $k^{th}$ subset of $\{1, 2, \ldots, N_g\}$ with g elements), and $N_g$ is the total number of SRS groups (panels).

For simplification in signaling, one can assign states such that the maximum number of resources per resource group in any of the SRS resource groups configured to the UE, $M_{max}$, is always assumed when calculating SRI, and then the number of SRI states can be written as $$S_T = \sum_{g=1}^{N} \binom{N_g}{g} (M_{max})^g.$$

The single fixed order can be such that the combinations of SRS resource indices selected by SRI are monotonically increasing such that the first MIMO layer has the lowest SRS index, the second MIMO layer has the next lowest SRS index, etc. Alternatively, the combinations of SRS resource indices selected by SRI are monotonically decreasing such that the first MIMO layer has the highest SRS index, the second MIMO layer has the next highest SRS index, etc.

In this embodiment, with $N_g=2$ resource groups and $M_i=4$ resources in each SRS resource group, and $L_{max}=2$, $S_T=24$ SRI states are needed, and so 5 bits could be used to signal SRI to the UE in this embodiment.

In some embodiments, the SRI can be encoded as the following:

SRI=$Y(g_1, g_2, \ldots, g_{L_{max}}) \cdot (\Pi_{k=1}^{L} M_k) + (\Sigma_{l=1}^{L} (\Pi_{k=1}^{l-1} M_k) X_l)$, where $0 \le X_l < M_1$ is the identifier of the SRS resource selected from the SRS resource group with index l, and $\Pi_{k=1}^{0} M_k \triangleq 1$. The number of selected SRS resource groups L and the value of Y( ) can correspond to the selected SRS resource group indices $\{g_1, g_2, \ldots, g_{L_{max}}\}$ in a given row of a table, where L is the number of selected SRS resources. In the table in FIG. 7 for an example embodiment below, $L_{max}=4$ SRS resource groups are configured. The possible values of $\{g_1, g_2, \ldots, g_{L_{max}}\}$ are given as well as the corresponding values of L and $Y(g_1, g_2, \ldots, g_{L_{max}})$. In general, a table for a given value of $L_{max}$ is constructed by first selecting each possible resource group of $L_{max}$ SRS resource groups, then each possible pair of resource groups of $L_{max}$ SRS resource groups, then each possible combination of 3 resource groups of $L_{max}$ SRS resource groups, and so on. The pairs and combinations are selected such that the indices of the selected resource groups follow a fixed order, such as a monotonically increasing order, and such that each pair or combination only appears once in the table.

In some embodiments, the number of layers L may be strictly less than the number of SRS resource groups configured to the UE, $L_{max}$. In this case, the function $Y(g_1, g_2, \ldots, g_{L_{max}})$ that is constructed as described above and shown in the example table below can produce values that can be encoded with a smaller number of bits than is needed for when $L \le L_{max}$. This can be seen in the table below by observing that for L=1, values of $Y(g_1, g_2, \ldots, g_{L_{max}})$ are 3 or less, therefore taking 2 bits to encode, whereas with $L \le 4$, 4 bits are needed. Therefore, in an embodiment, the size of the field used to signal SRI is determined according to the maximum number of MIMO layers that the UE is configured to transmit, the number of SRS resource groups from which an SRS resource may be selected, and the number of SRS resources in one or more SRS groups.

Figure 8:
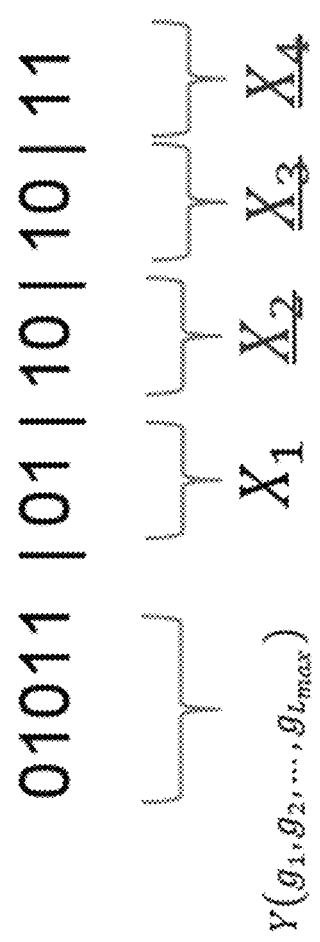
FIG. 8 is an example set of SRI indication bits indicating four SRS resources in four corresponding SRS resource groups.

In an alternative embodiment, the SRI is encoded directly as a bit stream rather than first being encoded as a decimal number and then mapped to a number of bits in the DCI. If the number of SRS resources per SRS resource groups are powers of two, i.e. $M_1=2^{m_l}$, this embodiment is functionally equivalent to the previously discussed embodiment. For example, the binary representation of $Y(g_1, g_2, \ldots, g_{L_{max}})$ may be mapped to the most significant bits, then the binary representation of $X_1$ is mapped to the subsequent bits, then the binary representation of $X_2$ and so forth until $X_L$ is mapped to the least significant bits. If $L < L_{max}$, the bitstream is padded with zeroes to fill up the field size. An example of this bit mapping is given in FIG. 8, where 4 SRS resource groups, each comprising 4 SRS resources, are assumed.

The described embodiments may be implemented in any appropriate type of communication system supporting any suitable communication standards and using any suitable components. As one example, certain embodiments may be implemented in an LTE network, such as that illustrated in FIG. 1.

Referring to FIG. 1, a radio access communication network 100 comprises a plurality of wireless communication devices 105 (e.g., conventional UEs, machine type communication [MTC]/machine-to-machine [M2M] UEs) and a plurality of radio access nodes 110 (e.g., eNodeBs or other base stations). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
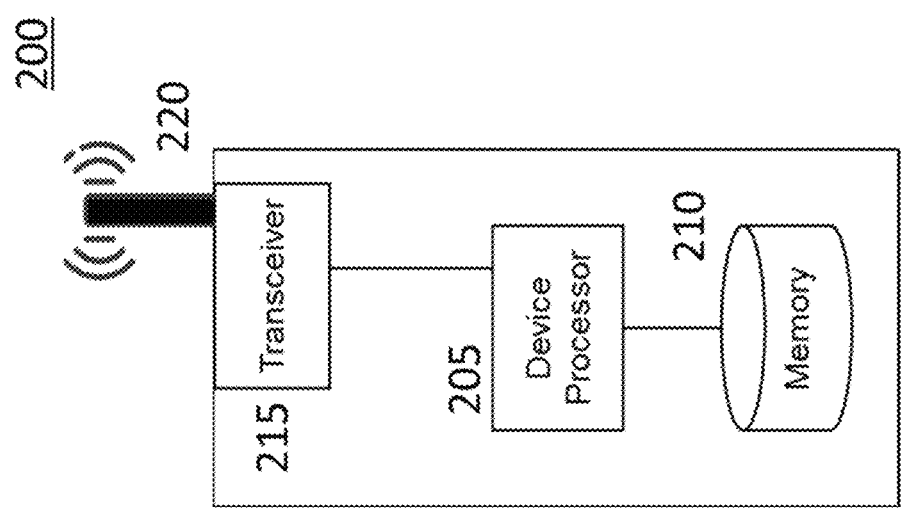
FIG. 2 is a diagram illustrating a wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio access node may represent network nodes that include any suitable combination of hardware and/or software, these nodes may, in particular embodiments, represent devices such as the example radio access node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
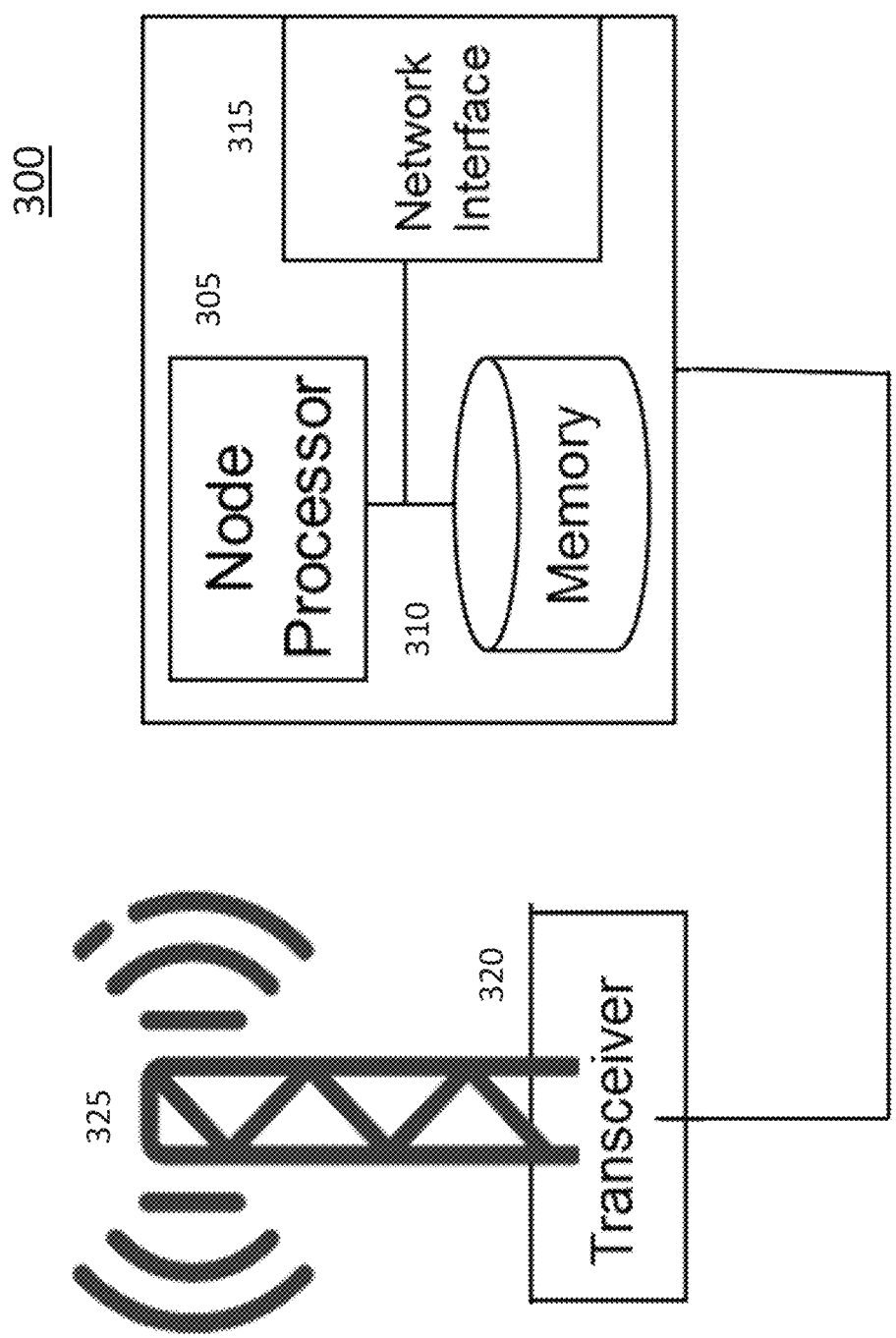
FIG. 3 is a diagram illustrating a radio access node.
Figure 4:
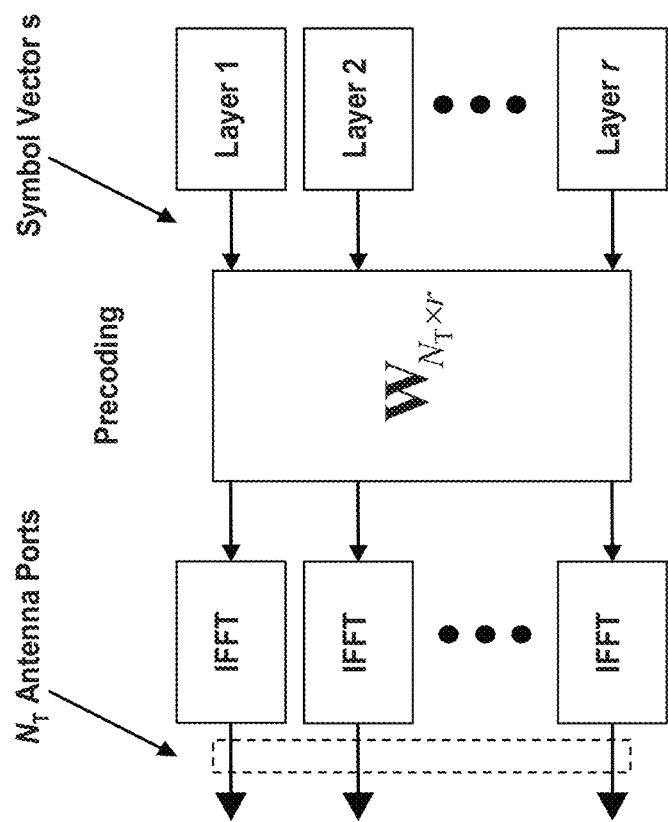
FIG. 4 is a functional block diagram of a spatial multiplexing operation.

Referring to FIG. 3, a radio access node 300 comprises a node processor 305, a memory 310, a network interface 315, a transceiver 320, and an antenna 325. In certain embodiments, some or all of the functionality described as being provided by a base station, a gNodeB, an eNodeB, and/or any other type of network node may be provided by node processor 305 executing instructions stored on a computer-readable medium, such as memory 310 shown in FIG. 3. Alternative embodiments of radio access node 300 may comprise additional components to provide additional functionality, such as the functionality described herein and/or related supporting functionality.

Figure 9:
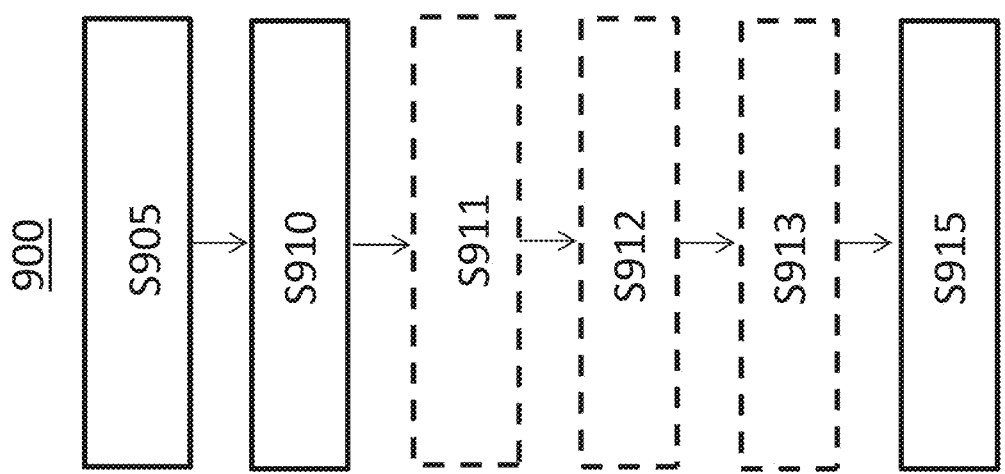
FIG. 9 is a flowchart illustrating a method of operating a wireless device.

FIG. 9 is a flowchart illustrating a method 900 of operating a wireless device (e.g., wireless communication device 105). The method 900 comprises a step S905 in which signaling is received from a network node in a wireless communications network, the signaling configuring the wireless device to use a plurality of reference signal resource groups, each group comprising a plurality of reference signal resources. The signaling may configure the wireless device to use the plurality of reference signal resource groups in a provisional sense, i.e., to be used as indicated by a message in a subsequently received control channel.

The method further comprises a step S910 in which an indication is received in a control channel (e.g., physical layer downlink control channel) from the network node, the indication including an indication of the reference signal resources to be used. Each of the reference signal resources to be used may be restricted to being selected from a different one of the plurality of reference signal resource groups such that reference signal resources belonging to the same reference signal resource group are not selected for simultaneous use. For example, the reference signal resources to be used include first and second reference signal resources selected only from a respective first and second one of the plurality of reference signal resource groups. The method 900 further includes a step S915 of transmitting a reference signal to the network node using the first and second reference signal resources.

In an alternative embodiment, the method 900 may further include steps S911, S912, and S913 intermediate to steps S910 and S915 in which the UE makes various determinations based on the indication received in step S910. For example, in optional step S911 the wireless device determines, from the indication, a first and second reference signal resource group, wherein the reference signal resource groups are reference signal resource groups. In optional step S912, the wireless device determines from the indication a first reference signal resource that is selected only from the first reference signal resource group and in optional step S913, the wireless device determines from the indication a second reference signal resource that is selected only from the second reference signal resource group. Moreover, in an alternative embodiment, step S915 can include transmitting at least one of reference signals identified by the first and second reference signal resources, and first and second MIMO layers mapped to the first and second reference signal resources, respectively.

In one embodiment, the reference signal resources are sounding reference signal (SRS) resources. In one embodiment, the indication of the plurality of reference signal resources to be used includes a bit field, where the length of the bit field depends on a maximum number of MIMO layers that the wireless device is capable of transmitting and a number of reference signal resources in a corresponding one of the reference signal resource groups. (When the wireless device is configured with uplink MIMO operation, the wireless device may also be configured to transmit the maximum number of MIMO layers that the wireless device is capable of transmitting.) The length of the bit field is sufficient to indicate S combinations of SRS resources, wherein:

$$S = \sum_{L=1}^{L_{max}} \binom{N}{L},$$

and
where $L_{max}$ is a maximum number of MIMO layers that the wireless device is configured to transmit and N is the number of resources in the first reference signal resource group. In another embodiment, the bit field size may be determined based on a maximum number of MIMO layers that the wireless device is configured to transmit, a number of SRS resource groups from which an SRS resource may be selected, and a number of SRS resources in the plurality of SRS resource groups.

In one embodiment, the reference signal is transmitted for purposes of beam management. Furthermore, in one embodiment, the wireless device may include multiple antenna panels, each one of the plurality of reference signal resource groups corresponding to a different one of the antenna panels.

Figure 10:
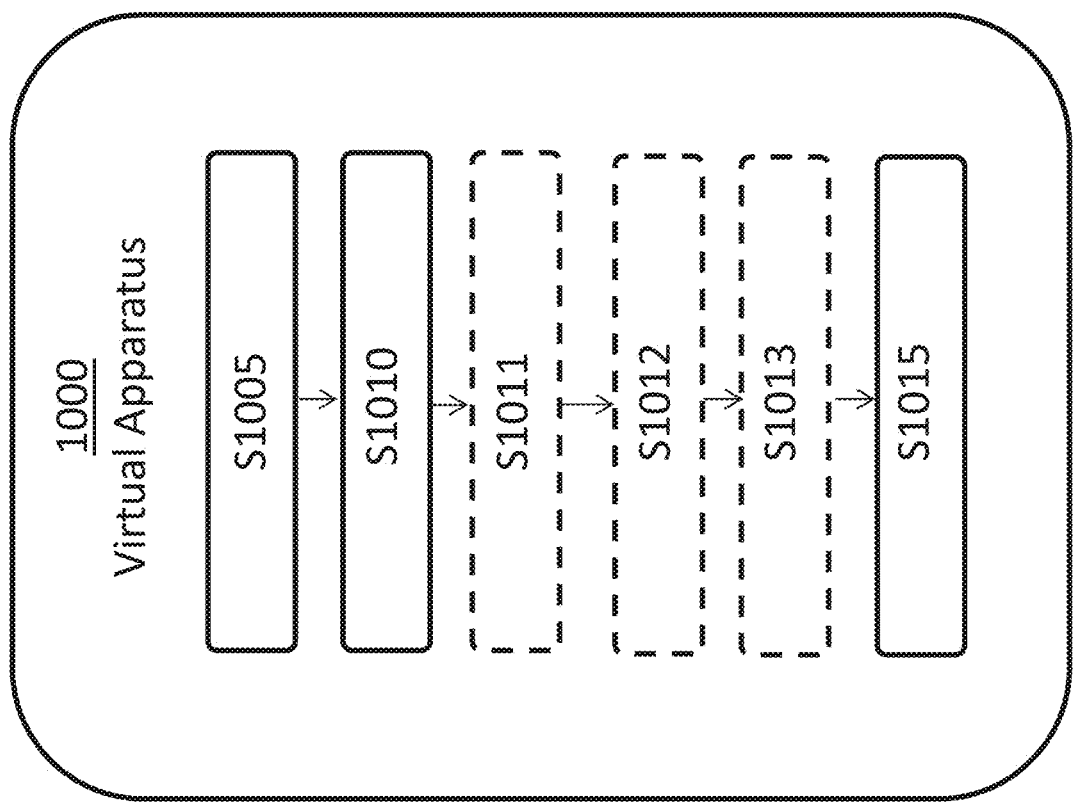
FIG. 10 is a diagram illustrating a virtual wireless device embodiment.

FIG. 10 is a schematic block diagram of an apparatus 1000 in a wireless network (for example, the wireless network shown in FIG. 1). The apparatus may be implemented in a wireless device (e.g., wireless device 105 shown in FIG. 1). Apparatus 1000 is operable to carry out the example method described with reference to FIG. 9 and possibly any other processes or methods disclosed herein. For example, module S1005 may carry out the functionality of step S905; module S1010 may carry out the functionality of step S910; optional module S1011 may carry out the functionality of optional step S911; optional module S1012 may carry out the functionality of optional step S912; optional module S1013 may carry out the functionality of optional step S913; and module S1015 may carry out the functionality of step S915. It is also to be understood that the method of FIG. 9 is not necessarily carried out solely by apparatus 1000. At least some operations of the method can be performed by one or more other entities.

Figure 11:
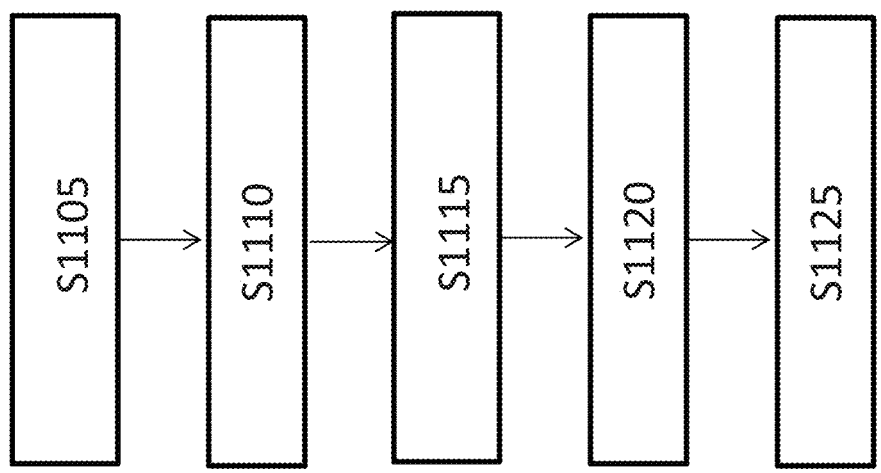
FIG. 11 is a flowchart illustrating a method of operating a network node.

FIG. 11 is a flowchart illustrating a method 1100 of operating a network node. The method 1100 comprises a step S1105 in which a total number of possible reference signal states is determined, the determination being based on a grouping of reference signal resources into reference signal resource groups, the grouping being configured such that only one reference signal resource is selectable from each reference signal resource group for use in a transmission. The method further comprises a step S1110 in which a mapping of different combinations of reference signal indication bits to respective ones of the possible reference signal states is determined. The mapping is then signaled to the wireless device at step S1115 and one or more preferred reference signal resources for an UL transmission from a wireless device are determined at step S1120. The method further comprises a step S11125 in which reference signal indication bits that are mapped by the mapping to an SRI state corresponding to the one or more preferred reference signal resources are signaled to the wireless device.

Figure 12:
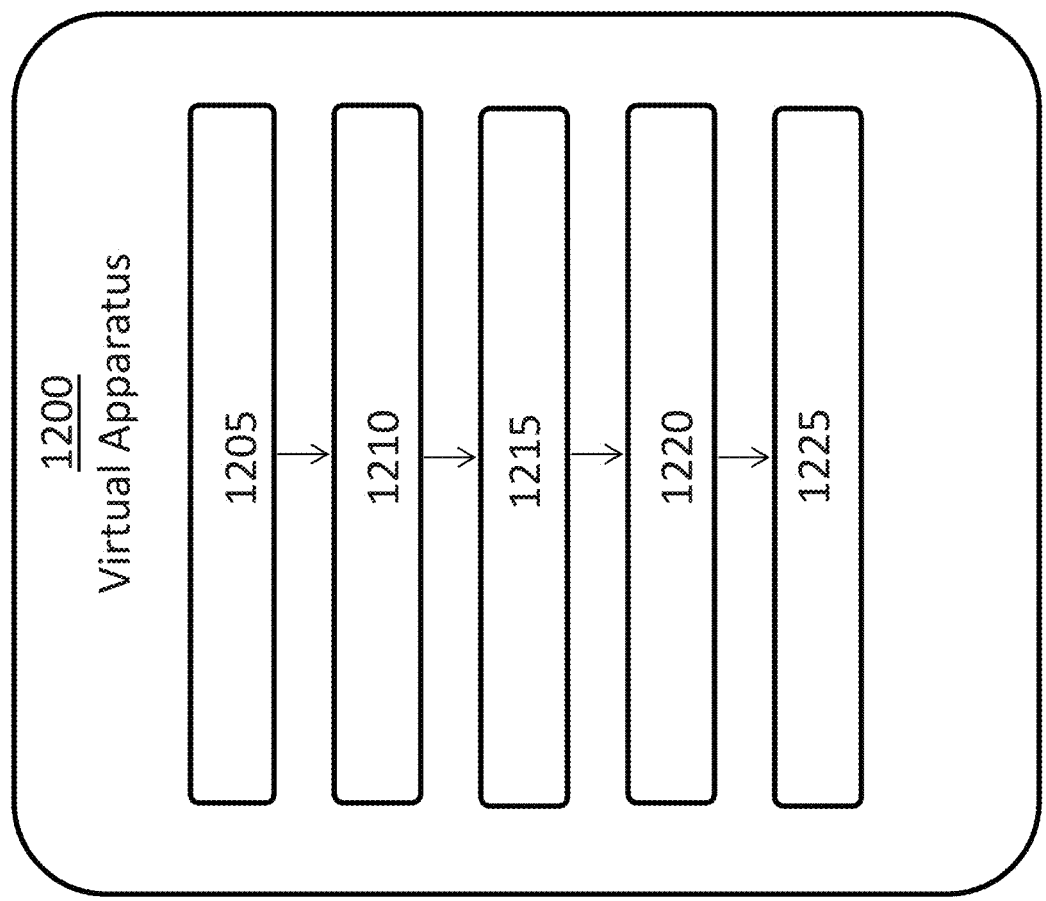
FIG. 12 is a graphical illustration of a virtual network node apparatus embodiment.

FIG. 12 illustrates a schematic block diagram of a virtual apparatus 1200 in a wireless network (for example, the wireless network shown in FIG. 1). The apparatus may be implemented in a network node (e.g., network node 110 shown in FIG. 1). Apparatus 1200 is operable to carry out the example method described with reference to FIG. 11 and possibly any other processes or methods disclosed herein. For example, module S1205 may carry out the functionality of step S1105; module S1210 may carry out the functionality of step S1110; module S1215 may carry out the functionality of step S1115; module S1210 may carry out the functionality of step S1110; module S1215 may carry out the functionality of step S1115; module S1220 may carry out the functionality of step S1120; and module S1225 may carry out the functionality of step S1125. It is also to be understood that the method of FIG. 11 is not necessarily carried out solely by apparatus 1200. At least some operations of the method can be performed by one or more other entities.

Figure 13:
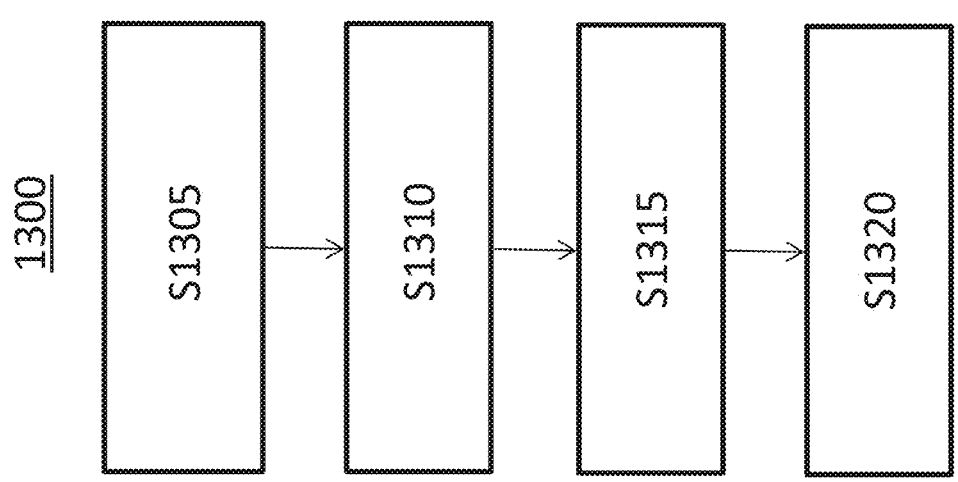
FIG. 13 is a flowchart illustrating another method of operating a wireless device.

FIG. 13 is a flowchart illustrating another method 1300 of operating a wireless device (e.g., wireless communication device 105). The method 1300 comprises a step S1305 in which the wireless device receives signaling configuring the wireless device with a plurality of SRS resources. The signaling configuring the wireless device with a plurality of SRS resources may also indicate groupings of the plurality of SRS resources into a plurality of SRS resource groups, each group comprising a plurality of SRS resources and wherein the first and second SRS resources are selected from the same SRS resource group. The method further comprises a step S1310 in which the wireless device receives an indication, in a physical layer downlink control channel, of SRS resources to be used. The method further comprises a step S1315 in which the wireless device determines from the indication at least a first and a second SRS resource out of the plurality of SRS resources that should be used in a transmission. According to predetermined SRS resource selection rules, for example, the indicated and determined first and second SRS resources are permitted to be any of the plurality of the SRS resources, except where the first and second SRS resources are the same. For example, the wireless device may determine the first and second SRS resources using a predetermined table, where the table includes only one entry for each possible ordering of a combination of SRS resources, thereby restricting the total number of selectable SRS resource combinations.

The method 1300 further comprises a step S1320 in which the wireless device transmits SRSs identified by the first and second SRS resource, and/or first and second MIMO layers that are mapped to the first and second SRS resources, respectively. The determination of first and second SRS resources in step S1315 may include identifying the first and second SRS resources from among the plurality of SRS resources by a first and second index, respectively, the first and second indexes further indicating an order in which the first and second SRS resources are to be mapped to the first and second MIMO layers. For example, the first and second MIMO layers are ranked by quality such that the first MIMO layer is of higher quality than the second MIMO layer and the first MIMO layer is mapped to by a lower one of the first and second indexes. Alternatively, the first MIMO layer may be mapped to by a higher one of the first and second indexes.

Figure 14:
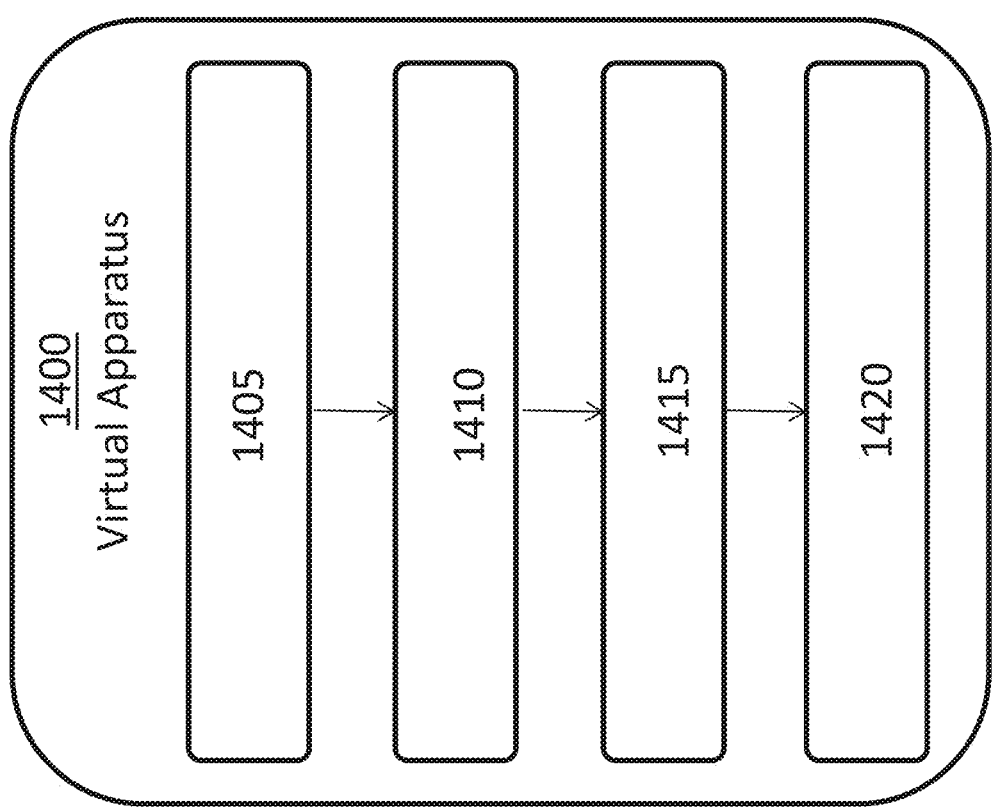
FIG. 14 is a graphical illustration of another virtual wireless device apparatus embodiment.

FIG. 14 illustrates a schematic block diagram of a virtual apparatus 1200 in a wireless network (for example, the wireless network shown in FIG. 1). The apparatus may be implemented in a wireless device (e.g., wireless device 105 shown in FIG. 1). Apparatus 1400 is operable to carry out the example method described with reference to FIG. 13 and possibly any other processes or methods disclosed herein. For example, module S1405 may carry out the functionality of step S1305; module S1410 may carry out the functionality of step S1310; module S1415 may carry out the functionality of step S1315; and module S1420 may carry out the functionality of step S1320. It is also to be understood that the method of FIG. 13 is not necessarily carried out solely by apparatus 1400. At least some operations of the method can be performed by one or more other entities.

Figure 15:
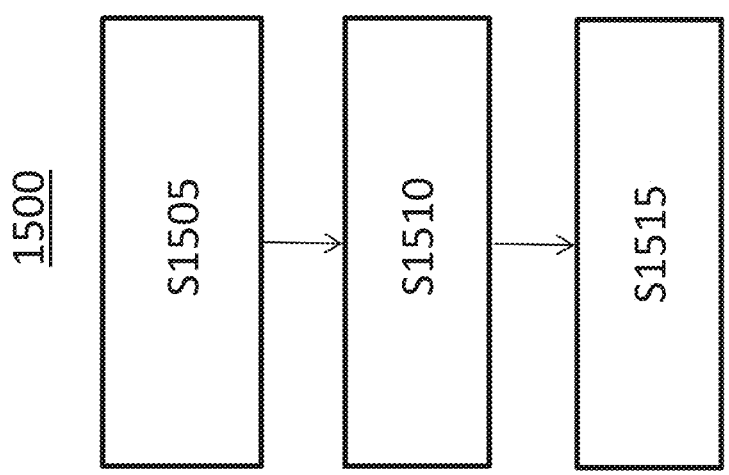
FIG. 15 is a flowchart illustrating another method of operating a network node.

FIG. 15 is a flowchart illustrating a method 1500 of operating a network node. The method 1500 comprises a step S1505 in which a network node transmits signaling configuring the wireless device with a plurality of reference signal resource groups, each group comprising a plurality of reference signal resources, e.g., sounding reference signal (SRS) resources. In one embodiment, the wireless device includes multiple antenna panels and each one of the plurality of reference signal resource groups corresponds to a different one of the antenna panels. The network node may be apprised of the number of multiple antenna panels and number of antennas on each panel, e.g., by a capabilities message transmitted in a control channel from the wireless device.

The method 1500 further includes a step S1510 in which the network node transmits an indication, in a control channel, of a selection of reference signal resources to be used. In accordance with a predetermined rule, the network node selects each of the plurality of reference signal resources to be used from a different one of the plurality of reference signal resource groups such that reference signal resources belonging to the same reference signal resource group are not selected for simultaneous use. The indication of the plurality of reference signal resources to be used may include a bit field, the length of the bit field depending on a maximum number of MIMO layers that the wireless device is configured to transmit and a number of reference signal resources in a corresponding one of the reference signal resource groups. Moreover, the bit field may be of sufficient length to indicate S combinations of SRS resources, wherein:

$$S = \sum_{L=1}^{L_{max}} \binom{N}{L},$$

and
where $L_{max}$ is a maximum number of MIMO layers that the wireless device is configured to transmit and N is the number of resources in the first reference signal resource group.

The method 1500 further includes a step S1515 in which the network node receives a reference signal (e.g., an SRS) from the wireless device using the indicated selection of reference signal resources. In one embodiment, the reference signal is received as part of a beam management procedure initiated by the network node or the wireless device.

Figure 16:
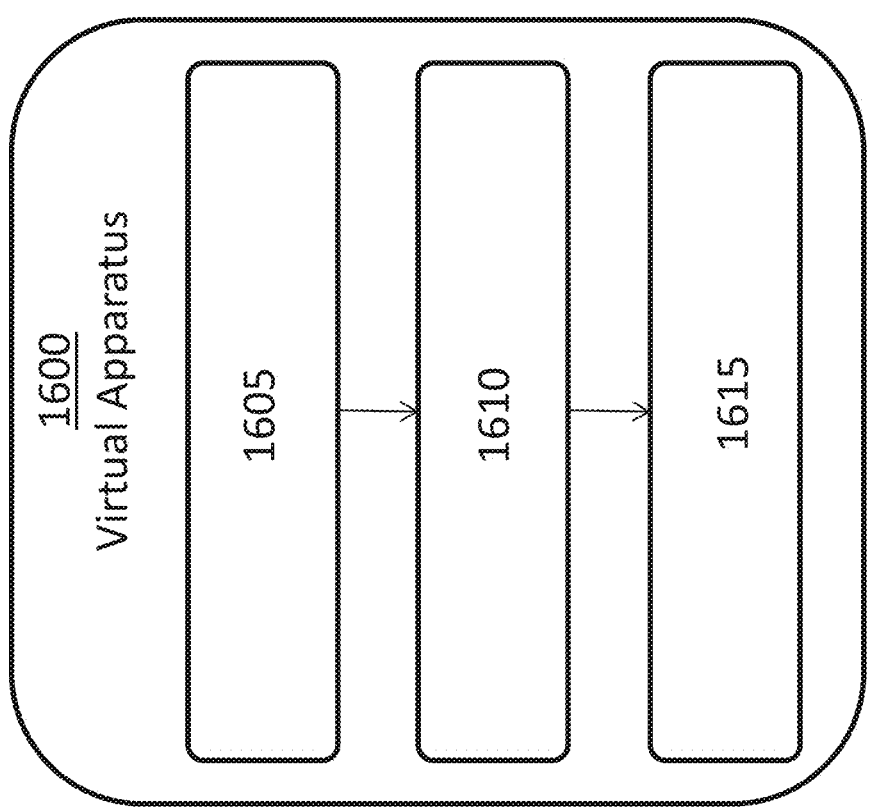
FIG. 16 is a graphical illustration of another virtual network node apparatus embodiment.

FIG. 16 illustrates a schematic block diagram of a virtual apparatus 1600 in a wireless network (for example, the wireless network shown in FIG. 1). The apparatus may be implemented in a network node (e.g., network node 110 shown in FIG. 1). Apparatus 1600 is operable to carry out the example method described with reference to FIG. 15 and possibly any other processes or methods disclosed herein. For example, module S1605 may carry out the functionality of step S1505; module S1610 may carry out the functionality of step S1510; and module S1615 may carry out the functionality of step S1515. It is also to be understood that the method of FIG. 15 is not necessarily carried out solely by apparatus 1600. At least some operations of the method can be performed by one or more other entities.

Figure 17:
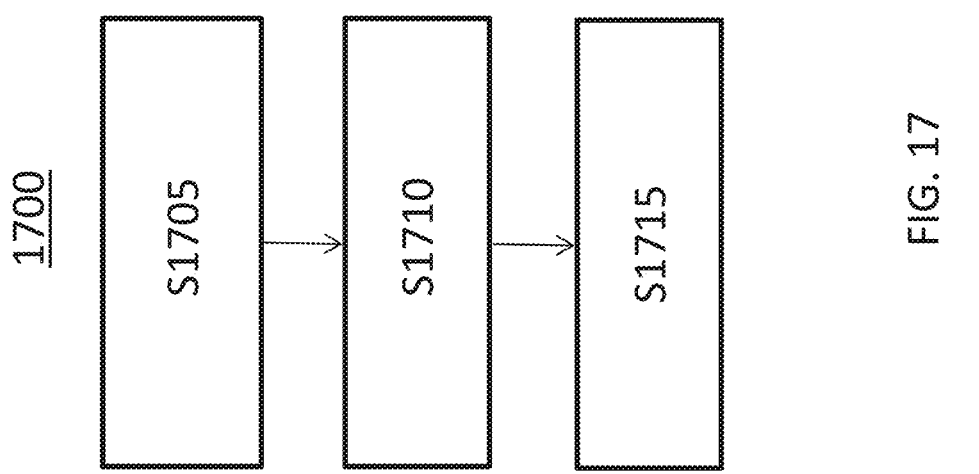
FIG. 17 is a flowchart illustrating another method of operating a network node.

FIG. 17 is a flowchart illustrating a method 1700 of operating a network node. The method 1700 comprises a step S1705 in which the network node transmits signaling configuring the wireless device with a plurality of SRS resources. The signaling configuring the wireless device with a plurality of SRS resources may also indicate groupings of the plurality of SRS resources into a plurality of SRS resource groups, each group comprising a plurality of SRS resources and wherein the first and second SRS resources are selected from the same SRS resource group. The method further comprises a step S1710 in which the network node transmits an indication, in a physical layer downlink control channel, of SRS resources to be used. The wireless device may determine from the indication at least a first and a second SRS resource out of the plurality of SRS resources that should be used in a transmission. According to predetermined SRS resource selection rules, for example, the indicated and determined first and second SRS resources are permitted to be any of the plurality of the SRS resources, except where the first and second SRS resources are the same. For example, the wireless device may determine the first and second SRS resources using a predetermined table, where the table includes only one entry for each possible ordering of a combination of SRS resources, thereby restricting the total number of selectable SRS resource combinations.

The method 1700 further includes a step S1715 in which the network node receives SRSs identified by the first and second SRS resource, and/or first and second MIMO layers that are mapped to the first and second SRS resources, respectively. The indication of first and second SRS resources in step S1710 may identify the first and second SRS resources from among the plurality of SRS resources by a first and second index, respectively, the first and second indexes further indicating an order in which the first and second SRS resources are to be mapped to the first and second MIMO layers. For example, the first and second MIMO layers are ranked by quality such that the first MIMO layer is of higher quality than the second MIMO layer and the first MIMO layer is mapped to by a lower one of the first and second indexes. Alternatively, the first MIMO layer may be mapped to by a higher one of the first and second indexes.

Figure 18:
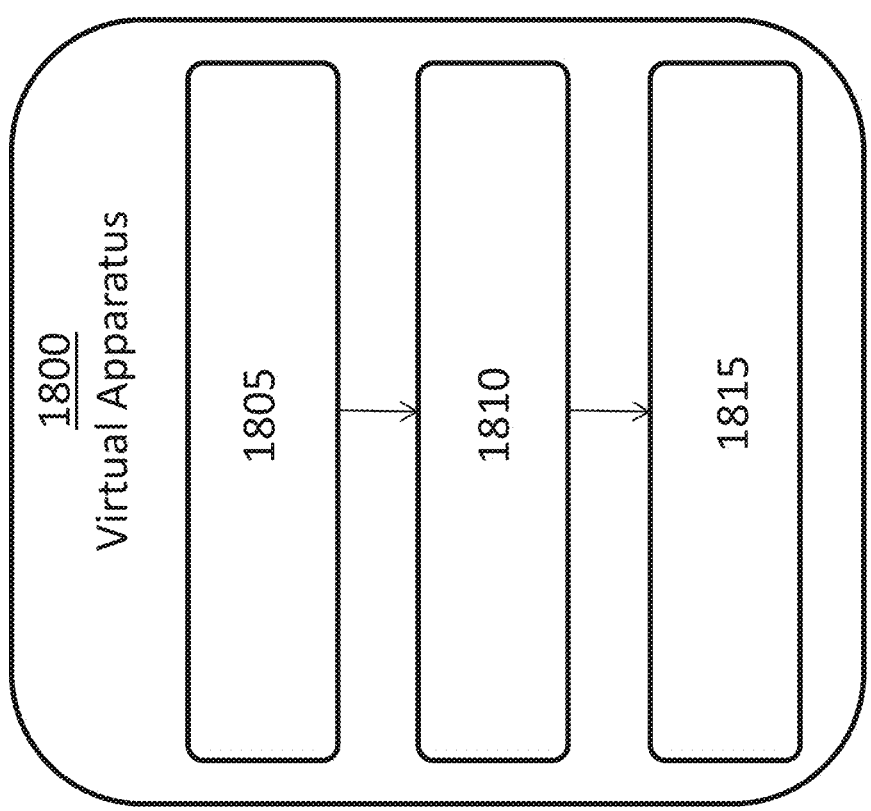
FIG. 18 is a graphical illustration of another virtual network node apparatus embodiment.

FIG. 18 illustrates a schematic block diagram of a virtual apparatus 1800 in a wireless network (for example, the wireless network shown in FIG. 1). The apparatus may be implemented in a network node (e.g., network node 110 shown in FIG. 1). Apparatus 1800 is operable to carry out the example method described with reference to FIG. 17 and possibly any other processes or methods disclosed herein. For example, module S1805 may carry out the functionality of step S1705; module S1810 may carry out the functionality of step S1710; and module S1815 may carry out the functionality of step S1715. It is also to be understood that the method of FIG. 18 is not necessarily carried out solely by apparatus 1800. At least some operations of the method can be performed by one or more other entities.

Each virtual apparatus 1000, 1200, 1400, 1600, and 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to perform the functionality of any suitable units of apparatus 1000 or 1200 to perform corresponding functions according to one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Operation in Virtualization Environments

Figure 19:
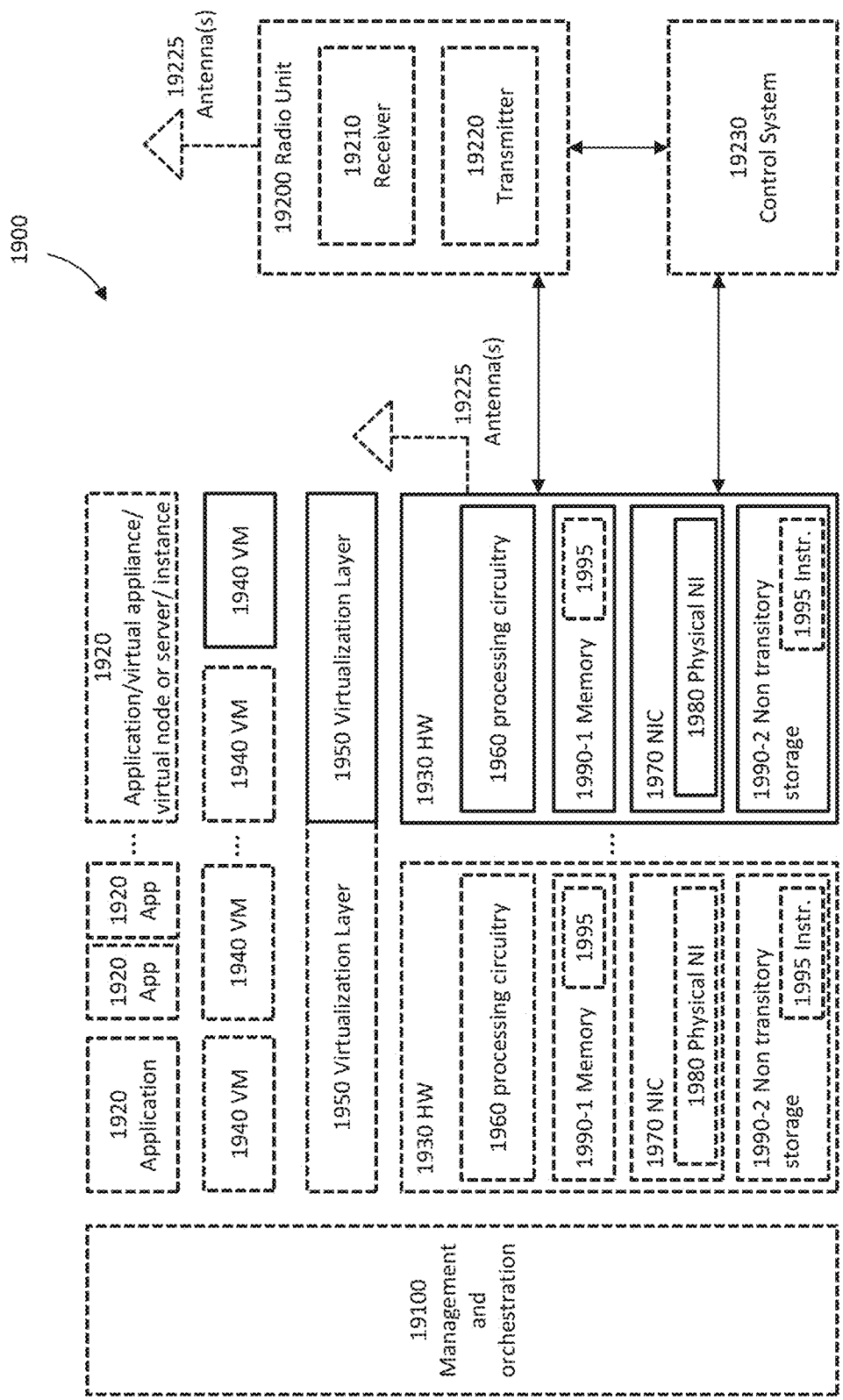
FIG. 19 is a graphical illustration of an example virtualization environment in which embodiments of the invention may operate.

FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signaling can be effected with the use of control system 19230 which may alternatively be used for communication between the hardware nodes 1930 and radio units 19200.

Operation with Remote Host Computers

Figure 20:
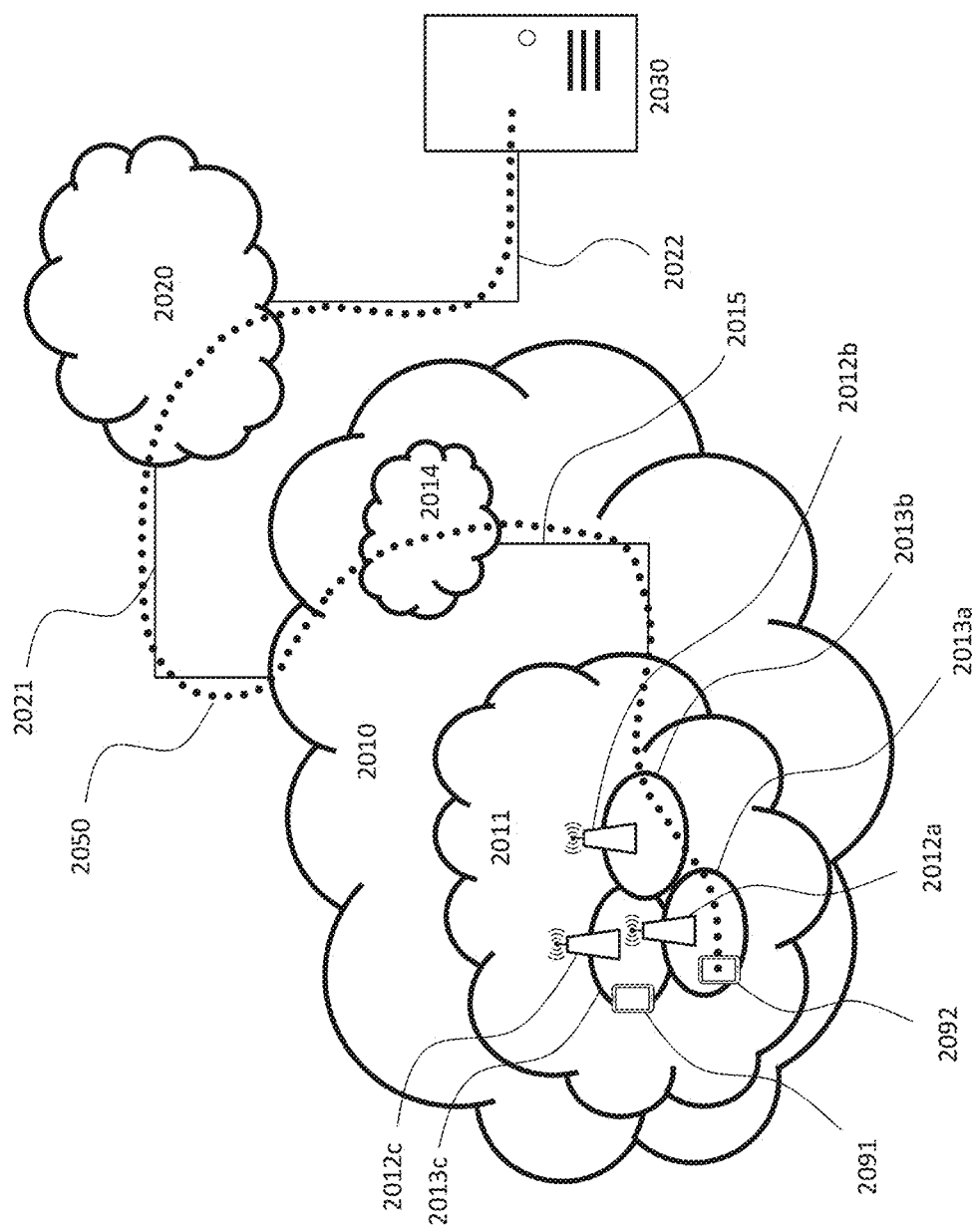
FIG. 20 is a graphical illustration of a telecommunication network connected via an intermediate network to a host computer in accordance with some embodiments.

With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A first UE 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

Figure 21:
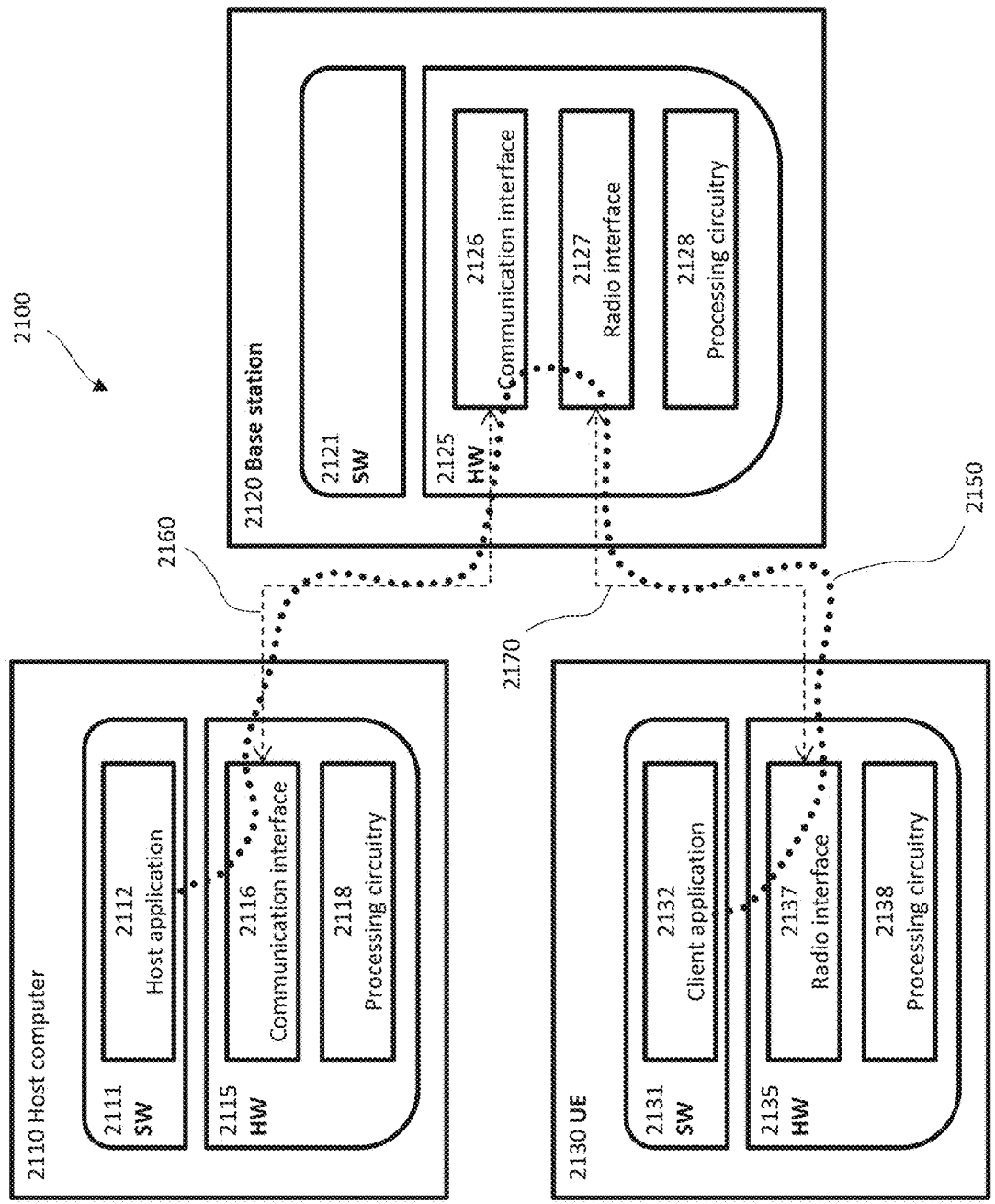
FIG. 21 is a graphical illustration of a host computer communicating via a base station with a user equipment over a partially wireless connection in accordance with some embodiments.

It is noted that host computer 2110, base station 2120 and UE 2130 illustrated in FIG. 21 may be similar or identical to host computer 2030, one of base stations 2012*a*, 2012*b*, 2012*c* and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the teachings of these embodiments may improve latency, among other things, and thereby provide benefits such as better responsiveness.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
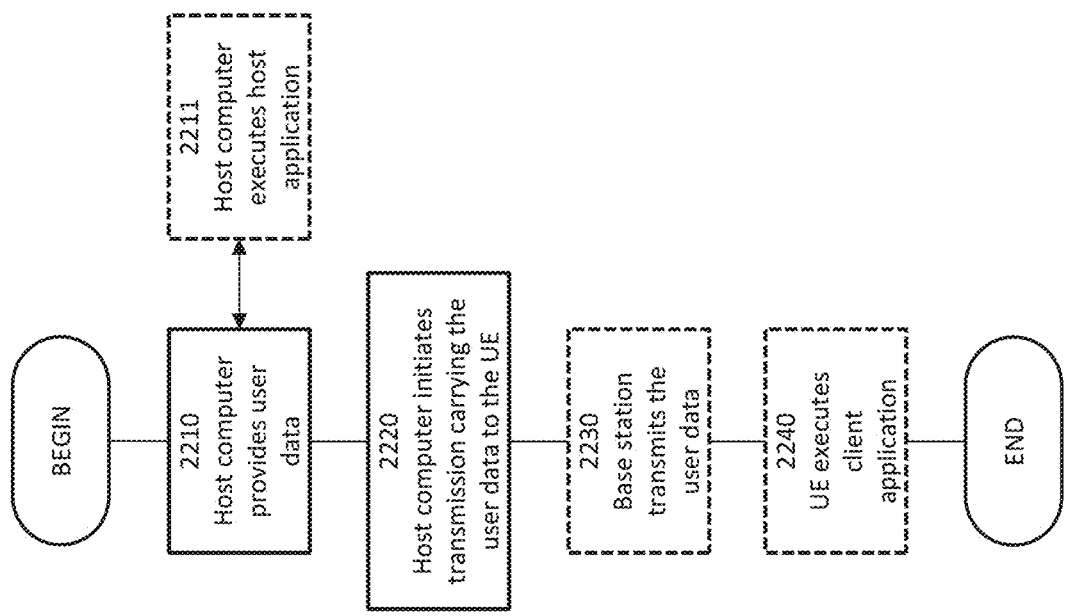
FIG. 22 is a flowchart illustrating a method implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
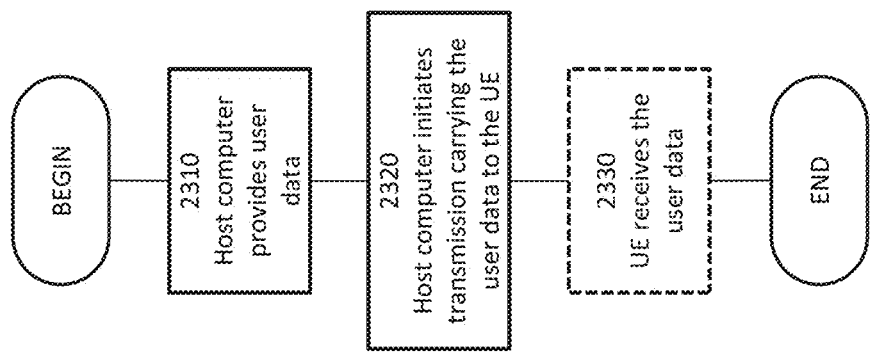
FIG. 23 is a flowchart illustrating another method implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

As described above, the exemplary embodiments provide both methods and corresponding apparatuses consisting of various modules providing functionality for performing the steps of the methods. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

While not being limited thereto, some example embodiments of the present disclosure are provided in an enumerated list below.

Example Embodiments

1. A method (900) in a wireless device (105), operable in a wireless communication network (100), of identifying reference signal resources to be used in a transmission by the wireless device, the method comprising: receiving (S905) signaling configuring the wireless device to use a plurality of reference signal resource groups, each group comprising a plurality of reference signal resources; receiving (S910) an indication, in a control channel, of the reference signal resources to be used, wherein the reference signal resources to be used include first and second reference signal resources selected only from a respective first and second one of the plurality of reference signal resource groups; and using (S915) the first and second reference signal resources in a reference signal transmission to a network node in the network.

2. The method of embodiment 1, wherein the reference signal resources are sounding reference signal (SRS) resources.

3. A method in a wireless device, operable in a wireless communication network, of identifying one or more SRS resources to be used in a transmission by the wireless device, the method comprising: receiving signaling configuring the wireless device to use a plurality of SRS resource groups, each group comprising a plurality of SRS resources; receiving an indication, in a physical layer downlink control channel, of the SRS resources to be used; determining, from the indication, a first and a second SRS resource group, wherein the first and second SRS resource groups are selected from the plurality of SRS resource groups; determining from the indication a first SRS resource that is selected only from the first SRS resource group; determining from the indication a second SRS resource that is selected only from the second SRS resource group; and transmitting at least one of: a) SRSs identified by the first and second SRS resource, and b) a first and a second MIMO layer in accordance with the transmission of the first and second SRS resources, respectively.

4. The method of embodiment 3, wherein a size of a field used to signal the indication is determined based on a maximum number of MIMO layers that the wireless device is configured to transmit, a number of SRS resource groups from which an SRS resource may be selected, and a number of SRS resources in the plurality of SRS resource groups.

5. A method in a wireless device, operable in a wireless communication network, of identifying one or more SRS resources to be used in a transmission by the wireless device, the method comprising: receiving signaling configuring the wireless device to use a plurality of SRS resources; receiving an indication, in a physical layer downlink control channel, of the SRS resources to be used; determining from the indication a first and a second SRS resource out of the plurality of SRS resources that should be used in a given transmission, wherein the first and second SRS resources can be any of the plurality of the SRS resources, except where the first and second SRS resources are the same; and transmitting at least one of: a) SRSs identified by the first and second SRS resource, and b) a first and a second MIMO layer in accordance with the transmission of the first and second SRS resources, respectively.

6. The method of embodiment 5, wherein the first and second SRS resources are each identified within the plurality of SRS resources by a first and second index, respectively; and the step of determining from the indication a first and a second SRS resource further has the further exception that the first index and second index are selected in a single fixed order, the single fixed order being one of: a) the first index is always greater than the second index, and b) the first index is always less than the second index.

7. A method in a wireless device, operable in a wireless communication network, of identifying one or more SRS resources to be used in a transmission by the wireless device, the method comprising: receiving signaling configuring the wireless device to use a first one of a plurality of SRS resource groups, the first SRS resource group comprising a plurality of SRS resources; receiving an indication, in a physical layer downlink control channel, of an SRS resource to be used; determining from the indication a first SRS resource that is selected only from the first SRS resource group; transmitting at least one of: a) an SRS identified by the first SRS resource, and b) a MIMO layer in accordance with the transmission of the first SRS resource.

8. A method (1100) in a network node, of configuring reference signal transmission settings in a wireless device operable in a wireless communication network, the method comprising: determining (S1105) a total number of possible reference signal states based on a grouping of reference signal resources into reference signal resource groups, the grouping being configured such that only one reference signal resource is selectable from each reference signal resource group for use in a transmission; determining (S1110) a mapping of different combinations of reference signal indication bits to respective ones of the possible reference signal states; signaling (S1115) the mapping to the wireless device; determining (S1120) one or more preferred reference signal resources for an UL transmission from a wireless device; and signaling (S1125), to the wireless device, reference signal indication bits that are mapped by the mapping to an SRI state corresponding to the one or more preferred reference signal resources.

9. The method of embodiment 8, wherein determining a total number of possible SRI states based on the grouping of SRS resource groups includes fixing an ordering by which SRS resources are mapped to MIMO layers, thereby restricting the total number of possible SRI states.

10. The method of embodiment 8, wherein determining a total number of possible SRI states based on the grouping of SRS resource groups includes allowing for SRS resources to be mapped to MIMO layers in any of a plurality of desired orders.

11. The method of any of embodiments 8-10, wherein the reference signal resources are sounding reference signal (SRS) resources.

12. A wireless device (105, 200) for facilitating communications in a wireless communication network (100) by obtaining an indication of reference signal resources to be used, the wireless device comprising processing circuitry configured to perform the steps of any of embodiments 1-7.

13. A network node (110, 300) for configuring a reference signal resource in the wireless communication network (100), the network node comprising processing circuitry configured to perform the steps of any of embodiments 8-11.

14. A user equipment (UE) (200) for facilitating communications in a wireless communication network (100) by obtaining an indication of a reference signal resources to be used, the UE comprising: an antenna (220) configured to send and receive wireless signals; a transceiver (215) connected to the antenna and to processing circuitry (205), and configured to condition signals communicated between the antenna and the processing circuitry; the processing circuitry being configured to perform the steps of any of embodiments 1-7.

15. A communication system including a host computer comprising: processing circuitry configured to provide user data; and a communication interface configured to forward the user data to a cellular network for transmission to a wireless device, wherein the cellular network comprises a network node having: a) a communication interface configured to receive the user data; b) a radio interface configured to interface with a wireless device to forward the user data to the wireless device; and c) processing circuitry configured to perform the steps of any of embodiments 8-11.

16. The communication system of any of the previous embodiment further including the network node.

17. The communication system of any of the previous 2 embodiments, further including the wireless device, wherein the wireless device is configured to communicate with the network node.

18. The communication system of any of the previous 3 embodiments, wherein: the processing circuitry of the host computer is configured to execute a host application, thereby providing the user data; and the wireless device comprises processing circuitry configured to execute a client application associated with the host application.

19. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs the steps of any of embodiments 1-16.

20. The method of the previous embodiment, further comprising, at the network node, transmitting the user data.

21. The method of any of the previous 2 embodiments, wherein the user data is provided at the host computer by executing a host application, the method further comprising, at the wireless device, executing a client application associated with the host application.

22. A communication system including a host computer and a wireless device, the host computer comprising: processing circuitry configured to provide user data; and a communication interface configured to forward user data to a cellular network for transmission to a wireless device, wherein the wireless device comprises a transceiver and processing circuitry, the wireless device's components being configured to perform the steps of any of embodiments 1-7.

23. The communication system of the previous embodiment, wherein the cellular network further includes a network node configured to communicate with the wireless device.

24. The communication system of any of the previous 2 embodiments, wherein: the processing circuitry of the host computer is configured to execute a host application, thereby providing the user data; and the wireless device's processing circuitry is configured to execute a client application associated with the host application.

25. A method implemented in a communication system including a host computer, a network node, and a wireless device, the method comprising: at the host computer, providing user data; and at the host computer, initiating a transmission carrying the user data to the wireless device via a cellular network comprising the network node, wherein the wireless device performs the steps of any of embodiments 1-7.

26. The method of the previous embodiment, further comprising at the wireless device, receiving the user data from the network node.

3GPP Contribution

The following description provides examples of how certain aspects of the embodiments described herein could be implemented within the framework of a specific communication standard. In particular, the following examples provide a non-limiting example of how the embodiments described herein could be implemented within the framework of a 3GPP RAN standard. The changes described by the examples are merely intended to illustrate how certain aspects of the embodiments could be implemented in a particular standard. However, the embodiments could also be implemented in other suitable manners, both in the 3GPP Specification and in other specifications or standards.

Title: UL MIMO for Non-Codebook Based Transmission

1—Introduction

In RAN1-NRAH3, the following agreements were reached online and offline:

The following were agreed in RAN1 #90: 1) For PUSCH precoder determination in non-codebook-based UL MIMO, support Alt.1, (i.e., at least SRI(s) only without TPMI indication in the UL grant) for wideband indication. Note: The gNB should only signal SRI(s) such that the UL precoding transmission inferred from the signaled SRI(s) can be simultaneously conducted by the UE. FFS details. FFS: If sub-band indication is supported, down-select Alt. 1-3 for it. 2) Specify UE capability identifying if UL MIMO capable UE can support coherent transmission across its transmit chains. FFS: if UE capability identifies if coherent transmission is supported on all of, vs. none of, vs. on a subset, of its transmit chains. FFS: how UL MIMO precoding design takes into account the above capability.

While the following were agreed in offline discussions in RAN1 NR AH #3 [1]: For non-codebook based transmission, a total of up to 4 SRS ports can be indicated using SRI(s). Note: For non-codebook based precoding, each SRS resource contains one port.

In this contribution, we discuss non-codebook based UL transmission and present some further details on SRI indication. In particular, we address the open issue of how the UE should signal SRI(s) such that the UL precoding inferred from the SRI(s) can be simultaneously conducted by the UE, how SRI signaling should take this into account, as well as the need for frequency selective signaling of SRI.

2—Non-Codebook Based UL Transmission

SRS resources can be narrow band and hence only occupy parts of the entire frequency band. However, the SRI(s) determining the preferred SRS resource(s) should be considered as wideband, which means that the SRI should be applied to the entire bandwidth of the corresponding PUSCH transmission. For instance, if wideband precoding of the SRS resource is used, the UE simply applies that same precoding for the entire PUSCH allocation. If frequency-selective precoding of the SRS resource is used, the UE shall not be expected to be scheduled on a resource allocation where it has not previously transmitted an SRS.

Frequency selective UL closed loop precoding has not been shown so far to provide substantial gains, at least for codebook based precoding [2] [3] [4]. Reciprocity based high resolution precoding may have additional potential for gain, and could also avoid extra overhead for frequency selective SRI. If full reciprocity cannot be utilized, frequency selective precoding could be enabled for non-codebook based UL transmissions by using frequency selective SRI. However, this will also lead to increased overhead signaling, so further studies will be needed to evaluate the performance gain vs. overhead of such schemes.

Proposal 1: Further study the need for frequency selective SRI, considering performance gain vs. overhead of non-codebook based UL transmission.

Figure 25:
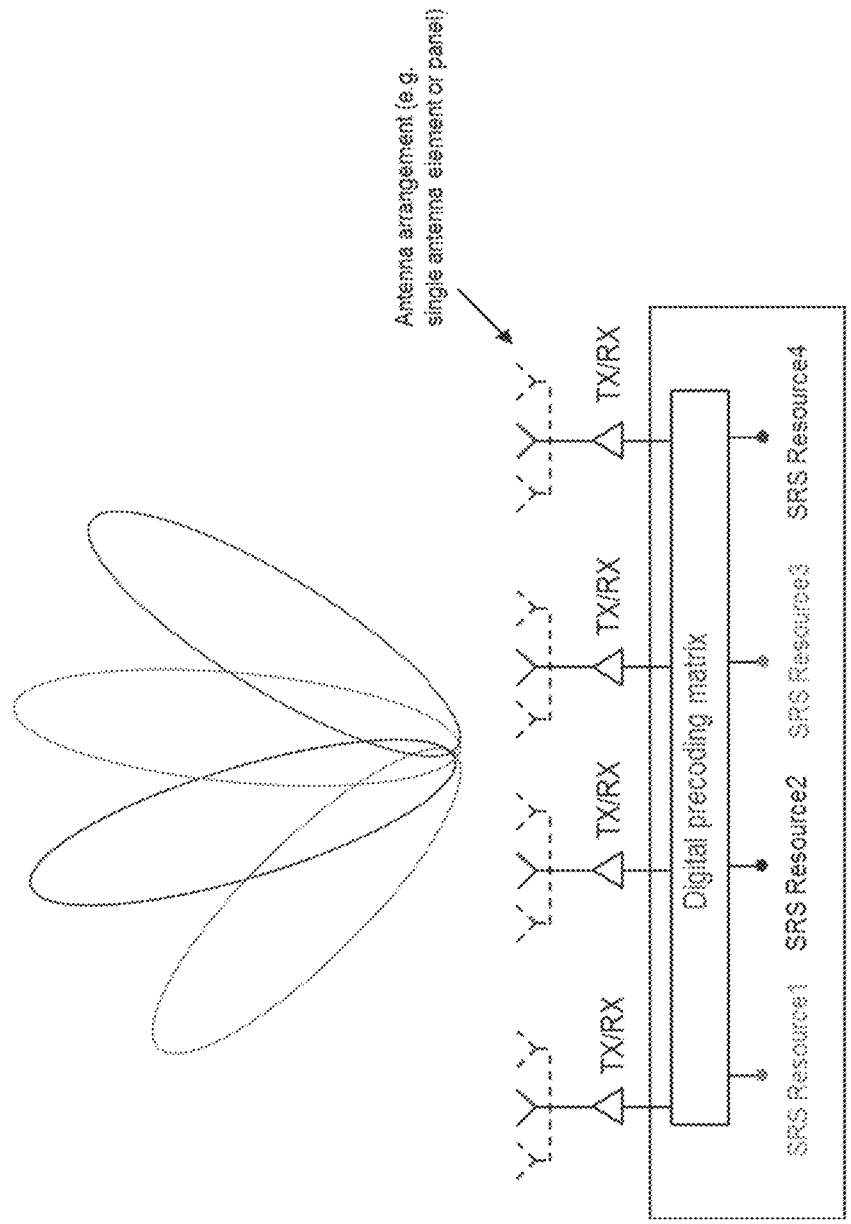
FIG. 25 illustrates an example operation of a digital precoder matrix in a wireless device.

Some UEs might not have calibrated (or only partly calibrated) radio chains which means that the relative phase of the transmit chains is not known by the UE. In this case precoding (i.e. coherent transmission) will be difficult to apply in a useful manner. Consequently, it was agreed in RAN1 #90 to support a UE capability identifying if a UL MIMO capable UE can support coherent transmission across its transmit chains. When the UE is not capable of transmitting coherently on any of its Tx chains, it is preferred that the UE distributes one SRS resource per antenna arrangement, corresponding to a unit matrix for the Digital precoder matrix seen in FIG. 25. The TRP can then select which antenna arrangements that should be used for UL transmissions by reporting one or several SRIs, where one layer is applied per SRI.

3—SRS Resource Groups

Concepts for UL beam management (i.e. beam management based on UL reference signals) are currently being developed for NR to control the beam (or more correctly the effective antenna pattern) for a respective UE antenna subset. It is expected that UL beam management is performed by letting the UE transmit different SRS resources in different UE antenna subset beams, which the TRP performs RSRP measurements on and signals back the SRI(s) corresponding to the SRS resource(s) with highest RSRP value(s). If a multi-antenna subset UE is scheduled for SRS transmission of multiple beams from each of the multiple antenna subsets, the TRP and UE need to have a mutual agreement of which combinations of SRS resources can be transmitted simultaneously from the different antenna subsets. Otherwise the TRP could select SRS resources that could not be transmitted simultaneously, such as when the SRS resources correspond to different switched analog beams in the same antenna subset. The note to the agreement from RAN1 #90 for signaling multiple SRIs (below) addresses this issue but does not conclude on how it should be done: Note: The gNB should only signal SRI(s) such that the UL precoding transmission inferred from the signaled SRI(s) can be simultaneously conducted by the UE.

One way to solve this is to identify groups of SRS resources, where only one of the resources in an SRS resource group can be transmitted at a time. The one resource from each of the SRS resource groups can be transmitted simultaneously with each of the other selected SRS resources from the other groups. Given the knowledge of the number of SRS resource groups, and which SRS resources are in the groups, the TRP can determine which SRS resources it can instruct the UE to transmit when multiple SRIs are signaled. One example will be given below:

Assume a UE with two antenna subsets (e.g., panels) (Antenna Subset/Panel A and Antenna Subset/Panel B), where each antenna subset has four analog beams (A1-A4 and B1-B4), as illustrated in FIG. 5. The UE will start with signaling to the TRP, in UE capabilities, that it has two SRS resource groups, where each SRS resources group consists of four SRS resources. For example, a total of SRS resources could be configured, where SRS resources 1-4 could belong to a first SRS resource group (corresponding to antenna subset A) and SRS resources 5-8 could belong to a second SRS resource group (corresponding to antenna subset B). During a UE TX beam sweep procedure (i.e. U3), the TRP can trigger these 8 SRS resources (by an indication in an aperiodic SRS transmission request) and the TRP will know the SRS resources that can and cannot be transmitted simultaneously given the SRS grouping. The TRP can then perform measurements on the eight transmitted SRS resources, determine the best SRS resource for each SRS resource group and signal the corresponding SRIs back to the UE. Note that each SRS resource can consist of one or several SRS ports, hence the procedure can be applied for both non-codebook based (single SRS port per SRS resource) and codebook based UL transmissions (one or several SRS ports per SRS resource). However, note that, for non-codebook based UL transmission where each SRS resource is allowed to be precoded over multiple antenna ports, the SRS precoding in this case (i.e. when UL beam management is present) should not be applied over antenna ports belonging to different antenna subsets (because then the mutual agreement that certain SRS resource only belongs to a certain antenna subset is broken).

We note that the notion of an SRS resource group here serves a similar purpose to DMRS port groups defined for the NR downlink and to the SRS port group proposed in [5]. Given that an SRI refers to an SRS resource, and since an SRS antenna port group would seem to imply some selection or subdivision within one SRS resource, 'SRS resource group' seems to be more appropriate to describe the intended behavior.

Proposal 2: SRS resource groups are defined, where a UE can be assumed to be able to transmit only one SRS resource in an SRS resource group at a time, and where a UE can simultaneously transmit one SRS resource from each of multiple SRS resource groups.

4—Utilizing SRS Resource Groups in SRI Indication

To indicate multiple SRI(s) in the DCI, one option is to use a size-N bitmap, where N is the number of SRS resources (corresponding to the maximum rank) and each bit indicates if the SRS resource shall be used to transmit a PUSCH layer or not. However, this is not a very efficient way of signaling which wastes DCI overhead.

Another option is to, for each rank, jointly indicate which SRS resources shall be used, and then jointly encode TRI and the multiple SRI(s). In this case, the SRI signaling from the TRP to the UE consists of indicating $$S_T = \sum_{L=1}^{L_{max}} S_L = \sum_{L=1}^{L_{max}} \binom{N}{L}$$

possible SRI states where $$S_k = \binom{N}{k}$$

is the number of combinations of N values taken k at a time, and N is the number of SRS resources, L the transmission rank, and $L_{max}$ the maximum transmission rank the UE is capable of. For example, with N=8 and $L_{max}=2$, then the total possible number of SRI states $$S_T = S_1 + S_2 = \binom{8}{1} + \binom{8}{2} = 8 + 28 = 36.$$

This means that 6 bits are required to indicate the chosen SRI state to the UE, compared with N=8 bits if the size-N bitmap approach was used.

Further reductions in SRI overhead are possible by taking into account constraints on SRS and/or PUSCH MIMO layer transmission. By way of example, assume there is a UE with two antenna subsets (e.g., panels) and four analog beams per antenna subset as illustrated in FIG. 5. In such a case, many of the possible SRI states will not be allowed because only one SRS resource from each SRS resource group can be selected. Hence, in this case it is preferred to do a mapping between the possible SRI states and the SRI signalling bits in order to reduce the overhead. For instance, the DCI signalling could indicate one of $$\binom{M}{L}$$

states, indicating which of the M SRS resource groups are used to transmit L layers, and then the SRS resource to be used in each selected SRS Resource group could be indicated. For example, if there are 4 SRS resources per group, then 4 states are needed to select a resource from a group. Then with M=2 resource groups and at most $L_{max}=2$ layers, $$S_T = S_1 + S_2 = \binom{2}{1} \cdot 4 + \binom{2}{2} \cdot 4 \cdot 4 = 24$$

total states, so 5 bits could be used to signal SRI given that SRS grouping is taken into account when signalling SRI in this case.

Observation 1: Overhead for SRI signalling can be reduced by considering the SRS resource groups during SRI signalling Proposal 3: Take into account SRS resource grouping when signalling multiple SRI indications in DCI 5—Conclusions In this contribution, we have discussed non-codebook based UL transmission and further details on SRI indication. In particular, we address the open issue of how the UE should signal SRI(s) such that the UL precoding inferred from the SRI(s) can be simultaneously conducted by the UE, how SRI signaling should take this into account, as well as the need for frequency selective signaling of SRI. Our analysis led to the following observation and proposals:

Observation 1: Overhead for SRI signalling can be reduced by considering the SRS resource groups during SRI signaling.

Proposal 1: Further study the need for frequency selective SRI, considering performance gain vs. overhead of non-codebook based UL transmission.

Proposal 2: SRS resource groups are defined, where a UE can be assumed to be able to transmit only one SRS resource in an SRS resource group at a time, and where a UE can simultaneously transmit one SRS resource from each of multiple SRS resource groups.

Proposal 3: Take into account SRS resource grouping when signalling multiple SRI indications in DCI.

6—References

R1-1716921, "Summary of offline discussion on UL MIMO Open Issues", Ericsson, 3GPP TSG RAN WG1 NR #3, Nagoya, Japan, Sep. 18-21, 2017

R1-1708669, "UL MIMO procedures for codebook based transmission", Ericsson, 3GPP TSG RAN WG1 Meeting #89, Hangzhou, P.R. China, May 15-19, 2017

R1-1711008, "UL MIMO procedures for codebook based transmission", Ericsson, 3GPP TSG RAN WG1 Meeting #89 adhoc 2, Qingdao, P.R. China, Jun. 27-30, 2017

R1-1714271, "UL MIMO for codebook based transmission", Ericsson, 3GPP TSG RAN WG1 Meeting #90, Prague, Czech Republic, Aug. 21-25, 2017

R1-1709735, "Way Forward on Uplink Multi-panel and Multi-TRP operation", Intel et. al., 3GPP TSG RAN WG1 Meeting #89, Hangzhou, P.R. China, May 15-19, 2017

LIST OF ABBREVIATIONS

TRP—Transmission/Reception Point
UE—User Equipment
NW—Network
BPL—Beam pair link
BLF—Beam pair link failure
BLM—Beam pair link monitoring
BPS—Beam pair link switch
RLM—radio link monitoring
RLF—radio link failure
PDCCH—Physical Downlink Control Channel
RRC—Radio Resource Control
CRS—Cell-specific Reference Signal
CSI-RS—Channel State Information Reference Signal
RSRP—Reference signal received power
RSRQ—Reference signal received quality
gNB—NR base station
PRB—Physical Resource Block
RE—Resource Element

The invention claimed is:

1. A method in a wireless device, operable in a cellular wireless communication network, of identifying a plurality of Sounding Reference Signal (SRS) resources, the method comprising:
   receiving signaling configuring the wireless device with a plurality of SRS resources;
   receiving an indication from a base station, in a physical layer downlink control channel, of SRS resources;
   determining from the indication at least a first and a second SRS resource out of the plurality of SRS resources, wherein the first and second SRS resources are not the same; and
   transmitting first and second multiple-input multiple-output (MIMO) layers that are mapped to the first and second SRS resources, respectively,
   wherein the first and second MIMO layers are mapped to the respective first and second SRS resources at least by use of a first precoding for the first MIMO layer and the first SRS resource and use of a second precoding for the second MIMO layer and the second SRS resource,
   wherein the wireless device determines the first and second SRS resources according to a table, wherein the table includes only one entry for each possible ordering of a combination of SRS resources.

2. The method of claim 1, wherein determining the at least first and second SRS resources includes identifying the first and second SRS resources from among the plurality of SRS resources by a first and second index, respectively; and
   wherein the first and second indexes further indicate an order in which the first and second SRS resources are to be mapped to the first and second MIMO layers.

3. The method of claim 1, wherein the signaling configuring the wireless device with a plurality of SRS resources indicates groupings of the plurality of SRS resources into a plurality of SRS resource groups, each group comprising a plurality of SRS resources and wherein the first and second SRS resources are selected from the same SRS resource group.

4. A wireless device for facilitating communications in a cellular wireless communication network by obtaining an indication of a reference signal resources to be used, the wireless device comprising:
   an antenna configured to send and receive wireless signals; and
   a transceiver connected to the antenna and to processing circuitry, and configured to condition signals communicated between the antenna and the processing circuitry, the processing circuitry being configured to carry out a method comprising:
   receiving signaling configuring the wireless device with a plurality of Sounding Reference Signal (SRS) resources;
   receiving an indication from a base station, in a physical layer downlink control channel, of SRS resources to be used;
   determining from the indication at least a first and a second SRS resource out of the plurality of SRS resources that should be used in a transmission, wherein the first and second SRS resources are not the same; and
   transmitting first and second multiple-input multiple-output (MIMO) layers that are mapped to the first and second SRS resources, respectively,
   wherein the first and second MIMO layers are mapped to the respective first and second SRS resources at least by use of a first precoding for the first MIMO layer and the first SRS resource and use of a second precoding for the second MIMO layer and the second SRS resource,
   wherein the UE determines the first and second SRS resources according to a table, wherein the table includes only one entry for each possible ordering of a combination of SRS resources.

5. The UE of claim 4, wherein determining the at least first and second SRS resources includes identifying the first and second SRS resources from among the plurality of SRS resources by a first and second index, respectively; and
   wherein the first and second indexes further indicate an order in which the first and second SRS resources are to be mapped to the first and second MIMO layers.

6. The UE of claim 4, wherein the signaling configuring the wireless device with a plurality of SRS resources indicates groupings of the plurality of SRS resources into a plurality of SRS resource groups, each group comprising a plurality of SRS resources and wherein the first and second SRS resources are selected from the same SRS resource group.

7. A method in a network node, operable in a cellular wireless communication network, of identifying a plurality of Sounding Reference Signal (SRS) resources to be used in a transmission by a wireless device, the method comprising:
   transmitting signaling configuring the wireless device with a plurality of SRS resources;
   transmitting an indication from the network node, in a physical layer downlink control channel, of SRS resources to be used in a transmission, the indicated SRS resources including at least a first and a second SRS resource out of the plurality of SRS resources, wherein the first and second SRS resources are not the same; and
   receiving first and second multiple-input multiple-output (MIMO) layers that are mapped to the first and second SRS resources, respectively,
   wherein the first and second MIMO layers are mapped to the respective first and second SRS resources at least by use of a first precoding for the first MIMO layer and the first SRS resource and use of a second precoding for the second MIMO layer and the second SRS resource,
   wherein the indication of the first and second SRS resources indicates an entry of a table, wherein the table includes only one entry for each possible ordering of a combination of SRS resources.

8. The method of claim 7, wherein the first and second SRS resources are each indicated from among the plurality of SRS resources by a first and second index, respectively; and wherein the first and second indexes further indicate an order in which the first and second SRS resources are to be mapped to the first and second MIMO layers.

9. The method of claim 7, wherein the signaling configuring the wireless device with a plurality of SRS resources indicates groupings of the plurality of SRS resources into a plurality of SRS resource groups, each group comprising a plurality of SRS resources and wherein the first and second SRS resources are selected from the same SRS resource group.

10. A network node for configuring a reference signal resource in the cellular wireless communication network, the network node comprising:

an antenna configured to send and receive wireless signals; and a transceiver connected to the antenna and to processing circuitry, and configured to condition signals communicated between the antenna and the processing circuitry, the processing circuitry being configured to carry out a method comprising:

transmitting signaling configuring the wireless device with a plurality of Sounding Reference Signal (SRS) resources;

transmitting an indication from the network node, in a physical layer downlink control channel, of SRS resources to be used in a transmission, the indicated SRS resources including at least a first and a second SRS resource out of the plurality of SRS resources, wherein the first and second SRS resources are not the same; and receiving first and second multiple-input multiple-output (MIMO) layers that are mapped to the first and second SRS resources, respectively, wherein the first and second MIMO layers are mapped to the respective first and second SRS resources at least by use of a first precoding for the first MIMO layer and the first SRS resource and use of a second precoding for the second MIMO layer and the second SRS resource, wherein the indication of the first and second SRS resources indicates an entry of a table, wherein the table includes only one entry for each possible ordering of a combination of SRS resources.

11. The network node of claim 10, wherein the first and second SRS resources are each indicated from among the plurality of SRS resources by a first and second index, respectively; and wherein the first and second indexes further indicate an order in which the first and second SRS resources are to be mapped to the first and second MIMO layers.

12. The network node of claim 10, wherein the signaling configuring the wireless device with a plurality of SRS resources indicates groupings of the plurality of SRS resources into a plurality of SRS resource groups, each group comprising a plurality of SRS resources and wherein the first and second SRS resources are selected from the same SRS resource group.

* * * * *

UNITED STATES PATENT AND TRADEMARK OFFICE
CERTIFICATE OF CORRECTION

PATENT NO. : 11,121,835 B2
APPLICATION NO. : 16/447680
DATED : September 14, 2021
INVENTOR(S) : Harrison et al.

It is certified that error appears in the above-identified patent and that said Letters Patent is hereby corrected as shown below:

In the Specification

In Column 1, Line 5, delete "2018," and insert -- 2018, now Pat. No. 10,374,768, --, therefor.

In Column 1, Line 23, delete "later" and insert -- latter --, therefor.

In Column 2, Line 26, delete "$N_{RX}N_T$" and insert -- $N_R X N_T$ --, therefor.

In Column 9, Line 57, delete "SKI" and insert -- SRI --, therefor.

In Column 10, Lines 66-67, delete "$S_T=\Sigma_{g=1}^{Ng}(\Sigma_{g=1}^{Ns(g)}\Pi_{i \in Gk}M_i),$" and insert -- $S_T=\Sigma_{g=1}^{Ng}(\Sigma_{k=1}^{Ns(g)}\Pi_{i \in Gk}M_i),$ --, therefor.

In Column 11, Lines 23-26, delete "
$$S_T = \sum_{g=1}^{N} \binom{N_g}{g} (M_{max})^g.$$
" and insert --
$$S_T = \sum_{g=1}^{N_g} \binom{N_g}{g} (M_{max})^g.$$
--, therefor.

In Column 11, Line 44, delete "$0 \leq X_l < M_l$" and insert -- $0 \leq X_l < M_l$ --, therefor.

In Column 12, Line 15, delete "$M_l=2^{ml}$," and insert -- $M_l=2^{ml}$ --, therefor.

In Column 14, Line 62, delete "S11125" and insert -- S1125 --, therefor.

Signed and Sealed this
Nineteenth Day of April, 2022

*Katherine Kelly Vidal*

Katherine Kelly Vidal
*Director of the United States Patent and Trademark Office*

In Column 27, Line 25, delete "RANI NR AH" and insert -- RAN1 NRAH --, therefor.

In Column 30, Line 54, delete "NR #3," and insert -- NR#3, --, therefor.